United States Patent
Wang et al.

(10) Patent No.: US 12,324,039 B2
(45) Date of Patent: Jun. 3, 2025

(54) SESSION ESTABLISHMENT METHOD, DATA TRANSMISSION METHOD, AND RELATED APPARATUS

(71) Applicant: Huawei Technologies Co., Ltd., Shenzhen (CN)

(72) Inventors: Jun Wang, Shanghai (CN); Mingzeng Dai, Shenzhen (CN); Qinghai Zeng, Shanghai (CN); Wenjie Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 455 days.

(21) Appl. No.: 17/737,791

(22) Filed: May 5, 2022

(65) Prior Publication Data
US 2022/0264682 A1 Aug. 18, 2022

Related U.S. Application Data

(63) Continuation of application No. PCT/CN2019/116022, filed on Nov. 6, 2019.

(51) Int. Cl.
*H04W 76/15* (2018.01)
*H04W 4/08* (2009.01)
*H04W 76/11* (2018.01)

(52) U.S. Cl.
CPC .......... *H04W 76/15* (2018.02); *H04W 4/08* (2013.01); *H04W 76/11* (2018.02)

(58) Field of Classification Search
CPC ....... H04W 76/15; H04W 4/08; H04W 76/11; H04W 76/40; H04W 76/12
See application file for complete search history.

(56) References Cited

U.S. PATENT DOCUMENTS

2017/0325118 A1* 11/2017 Li ..................... H04W 4/06
2019/0191409 A1* 6/2019 Stojanovski .......... H04W 72/23
(Continued)

FOREIGN PATENT DOCUMENTS

CN 103067868 A 4/2013
CN 108307530 A 7/2018
(Continued)

OTHER PUBLICATIONS

Kousaridas et al., "Local End-to-End Paths for Low Latency Vehicular Communication," 2018 IEEE 87th Vehicular Technology Conference (VTC Spring), Total 7 pages, XP033377577, Institute of Electrical and Electronics Engineers, New York, New York (Jun. 3-6, 2018).

(Continued)

*Primary Examiner* — Liem H. Nguyen
(74) *Attorney, Agent, or Firm* — Leydig, Voit & Mayer, Ltd.

(57) ABSTRACT

A session establishment method, a data transmission method, and a related apparatus are provided. A first device receives a first message sent by a second device. The first device establishes a first session with a third device based on the first message. The first message carries a first identifier and a second identifier, and the second identifier indicates information about a group to which the first identifier belongs. A fourth device is determined based on the second identifier. According to the application, the efficiency on determining the fourth device is improved, thereby improving data transmission efficiency.

12 Claims, 15 Drawing Sheets

(56) References Cited

U.S. PATENT DOCUMENTS

| | | | |
|---|---|---|---|
| 2019/0191467 A1* | 6/2019 | Dao | H04W 76/11 |
| 2020/0228936 A1* | 7/2020 | Talebi Fard | H04W 4/08 |
| 2021/0044454 A1* | 2/2021 | Xu | H04L 49/351 |
| 2022/0132621 A1* | 4/2022 | Shi | H04L 67/14 |
| 2022/0360469 A1* | 11/2022 | Xu | H04L 45/64 |

FOREIGN PATENT DOCUMENTS

| | | |
|---|---|---|
| CN | 108617014 A | 10/2018 |
| CN | 110167190 A | 8/2019 |
| CN | 110324907 A | 10/2019 |
| CN | 110417633 A | 11/2019 |
| EP | 3324658 B1 | 7/2019 |
| EP | 3249998 B1 | 10/2019 |
| WO | 2018165988 A1 | 9/2018 |
| WO | 2019030710 A1 | 2/2019 |
| WO | 2019101104 A1 | 5/2019 |
| WO | 2019129212 A1 | 7/2019 |
| WO | 2019160743 A1 | 8/2019 |
| WO | 2019161927 A1 | 8/2019 |

OTHER PUBLICATIONS

"Update to Solution 15," 3GPP TSG-SA WG2 Meeting #129Bis, West Palm Beach, USA, S2-1812414, Total 15 pages, 3rd Generation Partnership Project, Valbonne, France (Nov. 26-30, 2018).

"(TP for NR BL CR for TS 38.473) QoS handling for SA over F1," 3GPP TSG-RAN WG3#99bis, R3-181884, Sanya, China, Total 14 pages, 3rd Generation Partnership Project, Valbonne, France (Apr. 16-20, 2018).

"3rd Generation Partnership Project; Technical Specification Group Radio Access Network; NG-RAN; NG Application Protocol (NGAP) (Release 15)," 3GPP TS 38.413 V15.5.0, pp. 1-329, 3rd Generation Partnership Project, Valbonne, France (Sep. 2019).

"3rd Generation Partnership Project; Technical Specification Group Radio Access Network; NR; Medium Access Control (MAC) protocol specification (Release 15)," 3GPP TS 38.321 V15.7.0, pp. 1-78, 3rd Generation Partnership Project, Valbonne, France (Sep. 2019).

"3rd Generation Partnership Project; Technical Specification Group Radio Access Network; NG-RAN; F1 application protocol (F1AP) (Release 15)," 3GPP TS 38.473 V15.7.0, pp. 1-221, 3rd Generation Partnership Project, Valbonne, France (Sep. 2019).

ZTE, "TP for UE Radio Bearer Management," 3GPP TSG RAN WG3 Meeting #96, R3-171598, Hangzhou, P.R.China, Total 12 pages, 3rd Generation Partnership Project, Valbonne, France (May 15-19, 2017).

* cited by examiner

SESSION ESTABLISHMENT METHOD, DATA TRANSMISSION METHOD, AND RELATED APPARATUS

CROSS-REFERENCE TO RELATED APPLICATIONS

This application is a continuation of International Application No. PCT/CN2019/116022, filed on Nov. 6, 2019, the disclosure of which is hereby incorporated by reference in its entirety.

TECHNICAL FIELD

Embodiments of this application relate to the communications field, and in particular, to a session establishment method, a data transmission method, and a related apparatus.

BACKGROUND

In a conventional $3^{rd}$ generation partnership project (3GPP) communications system, data communications is communications between a terminal device and an application server. During 3GPP data communications, the terminal device needs to first send a data packet to the APP server, and then the application server forwards the data packet to a terminal device that needs to perform data communications.

A manner of forwarding the data packet by the application server requires a long path and has a high delay. However, this problem can be resolved by using a local route method. A user plane function (UPF) first needs to obtain group member information. The group member information includes terminal devices and terminal device identifiers (identification, ID), and each terminal device corresponds to a unique terminal device ID. Then, the UPF identifies, based on a data radio bearer identifier (DRB ID) carried in a data packet, whether the data packet needs to be sent to an application server or needs to be forwarded to a terminal device by using a local route. One DRB ID corresponds to one terminal device ID. If the data packet needs to be forwarded to the terminal device by using the local route, the data packet is delivered to, based on the DRB ID, a base station corresponding to the DRB ID, and then the corresponding base station delivers the data packet to the corresponding terminal device through an air interface.

The existing local route method can resolve the problem of a long path and a high delay caused by the fact that the application server forwards the data packet. However, when the data packet is transmitted between the UPF and the base station and between the base station and the terminal device, if a plurality of terminal devices belong to a same base station and need to receive the data packet, terminal device IDs corresponding to a plurality of DRB IDs are required for determining the terminal devices that need to receive the data packet. Consequently, terminal device determining efficiency is low, and data packet transmission efficiency is low.

SUMMARY

Embodiments of this application provide a session establishment method, a data transmission method, and a related apparatus. When a plurality of fourth devices need to receive a data packet, information about a group to which a first identifier belongs that is indicated by a second identifier may be obtained, to determine the information about the group to which the plurality of fourth devices corresponding to a plurality of first identifiers belong. The plurality of fourth devices can be determined by using only one second identifier, and therefore, fourth device determining efficiency is improved. This improves data packet transmission efficiency.

According to a first aspect, an embodiment of this application provides a session establishment method, including the following steps.

In a control and user plane separation (CUPS) network architecture, when a plurality of fourth devices need to receive a data packet, a first device receives a first message sent by a second device. The first device may establish a first session with a third device by using the first message. The first message carries a first identifier and a second identifier, and the second identifier may indicate information about a group to which the first identifier belongs.

When the plurality of fourth devices need to receive the data packet, the first device may obtain the information about the group to which the first identifier belongs that is indicated by the second identifier, to determine the information about the group to which the plurality of fourth devices corresponding to a plurality of first identifiers belong. The plurality of fourth devices can be determined by using only one second identifier, and therefore, fourth device determining efficiency is improved. This improves data packet transmission efficiency.

With reference to the first aspect of this embodiment of this application, in a first implementation of the first aspect of this embodiment of this application, after the first device receives the first message sent by the second device, that is, after the first device establishes the first session with the third device, the first device may receive a data packet that is sent by the third device by using the first session. The data packet is marked as belonging to the group indicated by the second identifier.

During actual application in which the first device needs to receive the data packet, the first device receives the data packet that is sent by the third device by using the first session, and the data packet is marked as belonging to the group indicated by the second identifier. The first device can directly obtain the information about the group to which the data packet belongs. The information about the group to which the data packet belongs can be used to determine the group to which the data packet needs to be transmitted, to determine a fourth device that needs to receive the data packet. This improves feasibility of the solution.

With reference to the first implementation of the first aspect of this embodiment of this application, in a second implementation of the first aspect of this embodiment of this application, after the first device receives the first message sent by the second device, that is, after the first device establishes the first session with the third device, the first device may receive a notification message sent by the second device, and the first device may determine a multicast source data packet based on the notification message.

The second device determines the multicast source data packet and notifies the first device, so that the first device directly determines the multicast source data packet. When the first device transmits the data packet in a multicast manner, the first device may perform multicast directly by using the multicast source data packet, and therefore, multicast data source determining time is reduced. This improves data transmission efficiency and feasibility of the solution.

With reference to the first implementation of the first aspect of this embodiment of this application, in a third implementation of the first aspect of this embodiment of this application, after the first device receives the first message sent by the second device, that is, after the first device establishes the first session with the third device, the first device determines a multicast data source, and sends a notification message to the second device to notify the second device to determine a multicast source data packet.

The first device determines the multicast data source and notifies the second device, and the second device notifies the third device of this message, so that the third device directly determines the multicast data source. When the third device determines to transmit the data packet in a multicast manner, the third device may directly perform multicast by using the multicast source data packet, and therefore, multicast data source determining time is reduced. This improves data transmission efficiency and feasibility of the solution.

According to a second aspect, an embodiment of this application provides a session establishment method, including the following steps.

In a CUPS network architecture, when a plurality of fourth devices need to receive a data packet, a first device receives a second message sent by a second device, so that the first device can establish a second session with a third device based on the second message. The second message carries a third identifier, a second identifier, and a first list. The first list is a set of fourth identifiers. The fourth identifier is an identifier corresponding to the fourth device, and the third identifier corresponds to the fourth identifier in the first list. The second identifier may indicate information about a group to which the fourth identifier in the first list belongs.

When the plurality of fourth devices need to receive the data packet, the second identifier may indicate the information about the group to which the fourth identifier in the first list belongs. The plurality of fourth devices can be determined by using only one second identifier, and therefore, fourth device determining efficiency is improved. This improves data packet transmission efficiency.

With reference to the second aspect of this embodiment of this application, in a first implementation of the second aspect of this embodiment of this application, after the first device receives the second message sent by the second device, that is, after the first device establishes the second session with the third device, the first device and the first device may receive a data packet that is sent by the third device by using the second session, and the data packet is marked as belonging to the group indicated by the second identifier.

During actual application in which the first device needs to receive the data packet, the first device receives the data packet that is sent by the third device by using the first session, and the data packet is marked as belonging to the group indicated by the second identifier. The first device can directly obtain the information about the group to which the data packet belongs. The information about the group to which the data packet belongs can be used to determine the group to which the data packet needs to be transmitted, to determine a fourth device that needs to receive the data packet. In addition, the second session may transmit a plurality of data packets through only one channel, and therefore, transmission resource consumption is reduced. This improves transmission efficiency and feasibility of the solution.

According to a third aspect, an embodiment of this application provides a bearer establishment method, including the following steps.

In a CUPS network architecture, a first device sends a third message to a fifth device, and the first device may establish a first bearer with the fifth device by using the third message. The third message carries a fifth identifier and a second identifier. The second identifier is used to indicate information about a group to which a fourth identifier belongs, and the fourth identifier is an identifier corresponding to a fourth device.

When a plurality of fourth devices need to receive a data packet, the first device may obtain the information about the group to which the fourth identifier belongs that is indicated by the second identifier. The plurality of fourth devices can be determined by using only one second identifier, and therefore, fourth device determining efficiency is improved. This improves data packet transmission efficiency.

With reference to the third aspect of this embodiment of this application, in a first implementation of the third aspect of this embodiment of this application, after the first device sends the third message to the fifth device, that is, after the first device establishes the first bearer with the fifth device, the first device may send a data packet to the fifth device by using the first bearer, and the data packet is marked as belonging to the group indicated by the second identifier.

After the first device sends the data packet to the fifth device, because the data packet is marked as belonging to the group indicated by the second identifier, the fifth device can directly obtain the information about the group to which the data packet belongs. The information about the group to which the data packet belongs can be used to determine the group to which the data packet needs to be transmitted, to determine the fourth device that needs to receive the data packet. This improves feasibility of the solution.

With reference to either the third aspect of this embodiment of this application or the first implementation of the third aspect of this embodiment of this application, in a second implementation of the third aspect of this embodiment of this application, after the first device sends the third message to the fifth device, the first device may receive a notification message sent by the fifth device, and the first device may determine a multicast source data packet based on the notification message.

The first device determines the multicast source data packet based on the notification message sent by the fifth device, and therefore, time of determining the multicast source data packet by the first device is reduced. This improves data packet transmission efficiency.

With reference to either the third aspect of this embodiment of this application or the first implementation of the third aspect of this embodiment of this application, in a third implementation of the third aspect of this embodiment of this application, after the first device sends the third message to the fifth device, the first device may send a notification message to the fifth device, so that the fifth device determines a multicast source data packet based on the notification message.

The fifth device determines the multicast source data packet based on the notification message sent by the first device, and therefore, time of determining the multicast source data packet by the fifth device is reduced. This improves data packet transmission efficiency.

With reference to either the third aspect of this embodiment of this application or the first implementation of the third aspect of this embodiment of this application, in a fourth implementation of the third aspect of this embodiment of this application, after the first device sends the third message to the fifth device, the first device receives a second list sent by the fifth device. The second list is used by the fifth device to send a data packet to the fourth device in a unicast manner.

With reference to either the third aspect of this embodiment of this application or the first implementation of the third aspect of this embodiment of this application, in a fifth implementation of the third aspect of this embodiment of this application, after the first device sends the third message to the fifth device, the first device sends a second list to the fifth device. When the fifth device needs to send a data packet to the fourth device in a unicast manner, the data packet is sent based on the second list.

The fifth device may obtain the second list in different manners. This improves selectability and feasibility of this solution.

With reference to either the fourth implementation of the third aspect of this embodiment of this application or the fifth implementation of the third aspect of this embodiment of this application, in a sixth implementation of the third aspect of this embodiment of this application, after the first device sends the third message to the fifth device, the first device sends the second list to the fourth device, so that the fourth device can receive, based on the second list, the data packet that is sent by the fifth device in a unicast manner.

The first device may obtain the second list in different manners. In addition, after the second list is obtained, the second list is sent to the fourth device, so that the fourth device can receive the data packet that is sent in a unicast manner. This improves selectability and feasibility of this solution.

With reference to either the third aspect of this embodiment of this application or the first implementation of the third aspect of this embodiment of this application, in a seventh implementation of the third aspect of this embodiment of this application, after the first device sends the third message to the fifth device, the first device receives a sixth identifier sent by the fifth device. The sixth identifier is used by the fifth device to send a data packet to the fourth device in a multicast manner.

With reference to either the third aspect of this embodiment of this application or the first implementation of the third aspect of this embodiment of this application, in an eighth implementation of the third aspect of this embodiment of this application, after the first device sends the third message to the fifth device, the first device sends a sixth identifier to the fifth device.

The fifth device may obtain the sixth identifier in different manners. This improves selectability and feasibility of this solution.

With reference to either the seventh implementation of the third aspect of this embodiment of this application or the eighth implementation of the third aspect of this embodiment of this application, in a ninth implementation of the third aspect of this embodiment of this application, after the first device sends the third message to the fifth device, the first device sends the sixth identifier to the fourth device, so that the fourth device can receive, based on the sixth identifier, the data packet that is sent by the fifth device in a multicast manner.

The first device may obtain the sixth identifier in different manners. In addition, after the sixth identifier is obtained, the sixth identifier is sent to the fourth device, so that the fourth device can receive the data packet that is sent in a multicast manner. This improves selectability and feasibility of this solution.

With reference to either the third aspect of this embodiment of this application or the first implementation of the third aspect of this embodiment of this application, in a tenth implementation of the third aspect of this embodiment of this application, after the first device sends the third message to the fifth device, the fifth device may determine that the fifth device sends a data packet to the fourth device in a unicast manner, and the fifth device sends a first notification message to the first device, to notify the first device that the fifth device sends the data packet to the fourth device in a unicast manner.

With reference to either the third aspect of this embodiment of this application or the first implementation of the third aspect of this embodiment of this application, in an eleventh implementation of the third aspect of this embodiment of this application, after the first device sends the third message to the fifth device, the first device sends a notification message to the fifth device, and the fifth device may determine, based on the notification message, to send a data packet to the fourth device in a unicast manner.

The fifth device determines, in different manners, to send the data packet in a unicast manner. This improves selectability of this solution.

According to a fourth aspect, an embodiment of this application provides a bearer establishment method, including the following steps.

In a CUPS network architecture, a first device sends a fourth message to a fifth device, and the first device may establish a second bearer with the fifth device by using the fourth message. The fourth message carries a seventh identifier, a second identifier, and a first list. The first list is a set of fourth identifiers, the fourth identifier is an identifier corresponding to a fourth device, the seventh identifier corresponds to the fourth identifier in the first list, and the second identifier is used to indicate information about a group to which the fourth identifier in the first list belongs.

When a plurality of fourth devices need to receive a data packet, the first device may obtain the information about the group to which the fourth identifier belongs that is indicated by the second identifier. The plurality of fourth devices can be determined by using only one second identifier, and therefore, fourth device determining efficiency is improved. This improves data packet transmission efficiency.

With reference to the fourth aspect of this embodiment of this application, in a first implementation of the fourth aspect of this embodiment of this application, after the first device sends the fourth message to the fifth device, that is, after the first device establishes the second bearer with the fifth device, the first device may send a data packet to the fifth device by using the second bearer, and the data packet is marked as belonging to the group indicated by the second identifier.

After the first device sends the data packet to the fifth device, because the data packet is marked as belonging to the group indicated by the second identifier, the fifth device can directly obtain the information about the group to which the data packet belongs. The information about the group to which the data packet belongs can be used to determine the group to which the data packet needs to be transmitted, to determine the fourth device that needs to receive the data packet. This improves feasibility of the solution.

With reference to either the fourth aspect of this embodiment of this application or the first implementation of the fourth aspect of this embodiment of this application, in a second implementation of the fourth aspect of this embodiment of this application, the first device receives a second list sent by the fifth device. The second list is used by the fifth device to send a data packet to the fourth device in a unicast manner.

With reference to either the fourth aspect of this embodiment of this application or the first implementation of the fourth aspect of this embodiment of this application, in a third implementation of the fourth aspect of this embodiment of this application, the first device sends a second list to the fifth device.

The fifth device may obtain the second list in different manners. This improves selectability and feasibility of this solution.

With reference to either the second implementation of the fourth aspect of this embodiment of this application or the third implementation of the fourth aspect of this embodiment of this application, in a fourth implementation of the fourth aspect of this embodiment of this application, the first device sends the second list to the fourth device. The second list is used by the fourth device to receive the data packet that is sent by the fifth device in a unicast manner.

The first device may obtain the second list in different manners. In addition, after the second list is obtained, the second list is sent to the fourth device, so that the fourth device can receive the data packet that is sent in a unicast manner. This improves selectability and feasibility of this solution.

With reference to either the fourth aspect of this embodiment of this application or the first implementation of the fourth aspect of this embodiment of this application, in a fifth implementation of the fourth aspect of this embodiment of this application, the first device receives a sixth identifier sent by the fifth device. The sixth identifier is used by the fifth device to send the data packet to the fourth device in a multicast manner.

With reference to either the fourth aspect of this embodiment of this application or the sixth implementation of the fourth aspect of this embodiment of this application, in a sixth implementation of the fourth aspect of this embodiment of this application, the first device sends a sixth identifier to the fifth device.

The fifth device may obtain the sixth identifier in different manners. This improves selectability and feasibility of this solution.

With reference to either the fifth implementation of the fourth aspect of this embodiment of this application or the sixth implementation of the fourth aspect of this embodiment of this application, in a seventh implementation of the fourth aspect of this embodiment of this application, the first device sends the sixth identifier to the fourth device, and the sixth identifier is used by the fourth device to receive the data packet that is sent by the fifth device in a multicast manner.

The first device may obtain the sixth identifier in different manners. In addition, after the sixth identifier is obtained, the sixth identifier is sent to the fourth device, so that the fourth device can receive the data packet that is sent in a multicast manner. This improves selectability and feasibility of this solution.

With reference to either the fourth aspect of this embodiment of this application or the sixth implementation of the fourth aspect of this embodiment of this application, in an eighth implementation of the fourth aspect of this embodiment of this application, the fifth device sends a first notification message to the first device. The notification message is used to notify the first device that the fifth device sends the data packet to the fourth device in a unicast manner.

With reference to either the fourth aspect of this embodiment of this application or the sixth implementation of the fourth aspect of this embodiment of this application, in a ninth implementation of the fourth aspect of this embodiment of this application, the fifth device sends a second notification message to the first device. The notification message is used to notify the first device that the fifth device sends the data packet to the fourth device in a multicast manner.

The fifth device determines to send the data packet in a multicast or unicast manner. This improves selectability of this solution.

According to a fifth aspect, an embodiment of this application provides a data transmission method, including the following steps.

In a CUPS network architecture, a fifth device sends a data packet to a fourth device by using a second list. An identifier corresponding to the fourth device is a fourth identifier, a set of fourth identifiers is a first list, the second identifier indicates information about a group to which the fourth identifier in the first list belongs, and the second list is used to determine, based on the second identifier, the fourth device that belongs to the group to which the fourth identifier in the first list belongs.

When a plurality of fourth devices need to receive a data packet, the fifth device may obtain the information about the group to which the fourth identifier belongs that is indicated by the second identifier, and the second list may be used to determine the fourth device based on the information about the group to which the fourth identifier belongs, so that the plurality of fourth devices may be determined based on the second identifier or the second list, and therefore, fourth device determining efficiency is improved. This improves data packet transmission efficiency.

With reference to the fifth aspect of this embodiment of this application, in a first implementation of the fifth aspect of this embodiment of this application, the fifth device receives the second list sent by a first device.

With reference to the fifth aspect of this embodiment of this application, in a second implementation of the fifth aspect of this embodiment of this application, the fifth device sends the second list to a first device.

The fifth device may obtain the second list in different manners. This improves selectability and feasibility of this solution.

With reference to either the first implementation of the fifth aspect of this embodiment of this application or the sixth implementation of the fifth aspect of this embodiment of this application, in a third implementation of the fifth aspect of this embodiment of this application, the fifth device sends the second list to the fourth device. The second list is used by the fourth device to receive the data packet that is sent by the fifth device in a unicast manner.

With reference to the fifth aspect of this embodiment of this application, in a fourth implementation of the fifth aspect of this embodiment of this application, the fifth device receives a first notification message sent by the first device. The first notification message is used to determine that the fifth device sends the data packet to the fourth device in a unicast manner.

With reference to the fifth aspect of this embodiment of this application, in a fifth implementation of the fifth aspect of this embodiment of this application, the fifth device sends a first notification message to the first device. The first notification message is used to notify the first device that the fifth device sends the data packet to the fourth device in a unicast manner.

The fifth device may determine, in different manners, to send the data packet in a unicast manner. This improves selectability of this solution.

According to a sixth aspect, an embodiment of this application provides a data transmission method, including the following steps.

In a CUPS network architecture, a fifth device sends a data packet to a fourth device by using a sixth identifier. An identifier corresponding to the fourth device is a fourth identifier, a set of fourth identifiers is a first list, the second identifier indicates information about a group to which the fourth identifier in the first list belongs, and the sixth identifier is used to determine, based on the second identifier, the fourth device that belongs to the group to which the fourth identifier in the first list belongs.

When a plurality of fourth devices need to receive a data packet, the fifth device may obtain the information about the group to which the fourth identifier belongs that is indicated by the second identifier, and the sixth identifier may be used to determine the fourth device based on the information about the group to which the fourth identifier belongs, so that the plurality of fourth devices may be determined based on the second identifier or the sixth identifier, and therefore, fourth device determining efficiency is improved. This improves data packet transmission efficiency.

With reference to the sixth aspect of this embodiment of this application, in a first implementation of the sixth aspect of this embodiment of this application, the fifth device receives the sixth identifier sent by a first device.

With reference to the sixth aspect of this embodiment of this application, in a second implementation of the sixth aspect of this embodiment of this application, the fifth device sends the sixth identifier to a first device.

The fifth device may obtain the sixth identifier in different manners. This improves selectability and feasibility of this solution.

With reference to either the first implementation of the sixth aspect of this embodiment of this application or the second implementation of the sixth aspect of this embodiment of this application, in a third implementation of the sixth aspect of this embodiment of this application, the fifth device sends the sixth identifier to the fourth device. The sixth identifier is used by the fourth device to receive the data packet that is sent by the fifth device in a multicast manner.

With reference to the sixth aspect of this embodiment of this application, in a fourth implementation of the sixth aspect of this embodiment of this application, the fifth device receives a notification message sent by a first device. The notification message is used to determine that the fifth device sends the data packet to the fourth device in a multicast manner.

With reference to the sixth aspect of this embodiment of this application, in a fifth implementation of the sixth aspect of this embodiment of this application, the fifth device sends a second notification message to a first device. The second notification message is used to notify the first device that the fifth device sends the data packet to the fourth device in a multicast manner.

The fifth device may determine, in different manners, to send the data packet in a multicast manner. This improves selectability and feasibility of this solution.

With reference to the sixth aspect of this embodiment of this application, in a sixth implementation of the sixth aspect of this embodiment of this application, the fifth device sends a notification message to a first device. The notification message is used by the first device to determine a multicast source data packet.

With reference to the sixth aspect of this embodiment of this application, in a seventh implementation of the sixth aspect of this embodiment of this application, the fifth device receives a notification message sent by a first device. The notification message is used by the fifth device to determine a multicast source data packet.

The fifth device may determine the multicast source data packet in different manners. This improves selectability and feasibility of this solution.

According to a seventh aspect, an embodiment of this application provides a communications device. The communications device has a function of implementing behavior of the first device in the first aspect. The function may be implemented by hardware, or may be implemented by hardware executing corresponding software. The hardware or the software includes one or more modules corresponding to the function.

According to an eighth aspect, an embodiment of this application provides a communications device. The communications device has a function of implementing behavior of the first device in the second aspect. The function may be implemented by hardware, or may be implemented by hardware executing corresponding software. The hardware or the software includes one or more modules corresponding to the function.

According to a ninth aspect, an embodiment of this application provides a communications device. The communications device has a function of implementing behavior of the first device in the third aspect. The function may be implemented by hardware, or may be implemented by hardware executing corresponding software. The hardware or the software includes one or more modules corresponding to the function.

According to a tenth aspect, an embodiment of this application provides a communications device. The communications device has a function of implementing behavior of the first device in the fourth aspect. The function may be implemented by hardware, or may be implemented by hardware executing corresponding software. The hardware or the software includes one or more modules corresponding to the function.

According to an eleventh aspect, an embodiment of this application provides a communications device. The communications device has a function of implementing behavior of the fifth device in the fifth aspect. The function may be implemented by hardware, or may be implemented by hardware executing corresponding software. The hardware or the software includes one or more modules corresponding to the function.

According to a twelfth aspect, an embodiment of this application provides a communications device. The communications device has a function of implementing behavior of the fifth device in the sixth aspect. The function may be implemented by hardware, or may be implemented by hardware executing corresponding software. The hardware or the software includes one or more modules corresponding to the function.

According to a thirteenth aspect, an embodiment of this application provides a session establishment device. The session establishment device includes a processor, a memory, a bus, and an input/output device. The processor is connected to the memory and the input/output device, and the bus is separately connected to the processor, the memory, and the input/output device. The processor performs any method according to the first aspect and the possible implementations of the first aspect or any method according to the second aspect and the possible implementations of the second aspect.

According to a fourteenth aspect, an embodiment of this application provides a bearer establishment device. The bearer establishment device includes a processor, a memory, a bus, and an input/output device. The processor is connected to the memory and the input/output device, and the bus is separately connected to the processor, the memory, and the input/output device. The processor performs any method according to the third aspect and the possible implementations of the third aspect or any method according to the fourth aspect and the possible implementations of the fourth aspect.

According to a fifteenth aspect, an embodiment of this application provides a data transmission device. The data transmission device includes a processor, a memory, a bus, and an input/output device. The processor is connected to the memory and the input/output device, and the bus is separately connected to the processor, the memory, and the input/output device. The processor performs any method according to the fifth aspect and the possible implementations of the fifth aspect or any method according to the sixth aspect and the possible implementations of the sixth aspect.

This application further provides a communications apparatus. The apparatus may be an integrated circuit chip, and is configured to implement functions of the first device.

This application further provides a communications apparatus. The apparatus may be an integrated circuit chip, and is configured to implement functions of the fifth device.

According to another aspect of this application, a session establishment method is provided. The session establishment method is applied to a communications system, and the communications system includes a first device, a second device, and a third device.

The first device is configured to receive a first message sent by the second device.

The first device is further configured to establish a first session with the third device by using the first message.

The first device is further configured to receive a second message sent by the second device.

The first device is further configured to establish a second session with the third device by using the second message.

According to another aspect of this application, a bearer establishment method is provided. The session establishment method is applied to a communications system, and the communications system includes a first device and a fifth device.

The first device is configured to send a third message to the fifth device.

The first device is further configured to establish a first bearer with the fifth device by using the third message.

The first device is further configured to send a fourth message to the fifth device.

The first device is further configured to establish a second bearer with the device by using the fourth message.

According to another aspect of this application, a data transmission method is provided. The session establishment method is applied to a communications system, and the communications system includes a first device and a fifth device.

The fifth device is configured to send a data packet to the fourth device by using a second list.

The fifth device is further configured to send the data packet to the fourth device by using a sixth identifier.

According to another aspect of this application, a computer-readable storage medium is provided. The computer-readable storage medium stores instructions. When the instructions are run on a computer, the computer is enabled to perform the methods according to the foregoing aspects.

In the technical solution of embodiments of this application, when a plurality of fourth devices need to receive a data packet, information about a group to which a first identifier belongs that is indicated by s second identifier may be obtained, to determine the information about the group to which the plurality of fourth devices corresponding to a plurality of first identifiers belong. The plurality of fourth devices can be determined by using only one second identifier, and therefore, fourth device determining efficiency is improved. This improves data packet transmission efficiency.

DESCRIPTION OF EMBODIMENTS

Figure 1:
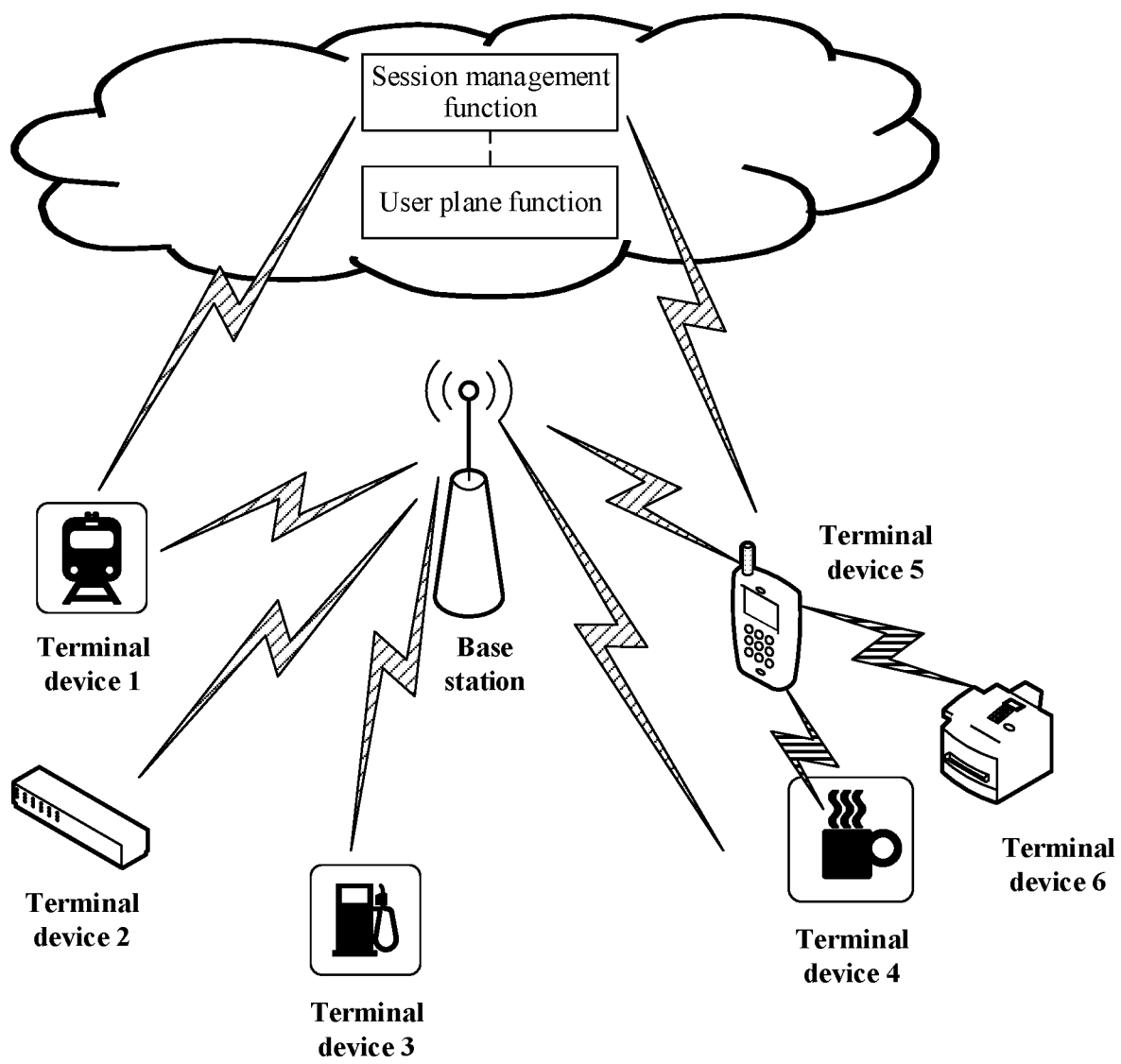
FIG. 1 is a schematic diagram of a system architecture of a new radio communications system according to an embodiment of this application.

Embodiments of this application provide a session establishment method, a data transmission method, and a related apparatus, to improve terminal device determining efficiency. This improves data packet transmission efficiency.

The following clearly and completely describes the technical solutions in embodiments of this application with reference to the accompanying drawings in embodiments of this application. It is clear that the described embodiments are merely some but not all of embodiments of this application.

In the specification, claims, and accompanying drawings of this application, terms "first", "second", "third", "fourth", and the like (if existent) are intended to distinguish between similar objects but do not necessarily indicate a specific order or sequence. It should be understood that the data termed in such a way are interchangeable in appropriate circumstances, so that the embodiments described herein can be implemented in other orders than the order illustrated or described herein. In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

The technical solutions in embodiments of this application may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single-carrier frequency division multiple access (SC-FDMA) system, and another system. Terms "system" and "network" are interchangeable. The CDMA system may implement wireless technologies such as universal terrestrial radio access (UTRA) and CDMA2000. The UTRA may include a wideband CDMA (WCDMA) technology and another variant technology of CDMA. CDMA2000 may cover the interim standard (IS) 2000 (IS-2000), the IS-95 standard, and the IS-856 standard. The TDMA system may implement wireless technologies such as a global system for mobile communications (GSM). The OFDMA system may implement wireless technologies such as evolved universal terrestrial radio access (evolved UTRA, E-UTRA), ultra mobile broadband (UMB), IEEE 802.11 (Wi-Fi), IEEE 802.16 (WiMAX), IEEE 802.20, and Flash OFDMA. The UTRA corresponds to a UMTS, and the E-UTRA corresponds to an evolved version of the UMTS. A new version of the UMTS that uses the E-UTRA is used in long term evolution (LTE) and various versions evolved based on LTE in 3GPP. A 5th generation (5G) communications system, new radio (NR), and a future 6th generation (6G) mobile communications system are next generation communications systems under research. The technical solutions in embodiments of this application may be applied to various communications systems such as V2X, LTE-V, V2V, the Internet of Vehicles, MTC, the IoT, LTE-M, M2M, and the Internet of Things. In addition, the communications system is further applicable to a future-oriented communications technology, and is applicable to the technical solutions provided in embodiments of this application. A system architecture and a service scenario described in embodiments of this application are intended to describe the technical solutions in embodiments of this application more clearly, and do not constitute a limitation on the technical solutions provided in embodiments of this application. Persons of ordinary skill in the art may know that with evolution of a network architecture and emergence of a new service scenario, the technical solutions provided in embodiments of this application are also applicable to similar technical problems.

Embodiments of this application are mainly applied to a schematic diagram of a system architecture of a new radio communications system as shown in FIG. 1. In the system architecture, functions of a core network element are classified into a user plane function (UPF) and an access and mobility management function (AMF). The UPF is mainly responsible for receiving and forwarding a data packet, the AMF is mainly responsible for establishing a session connection to a base station device, and the AMF may also receive uplink data sent by a terminal device.

Correspondingly, a base station is divided into a centralized unit (CU) and a distributed unit (DU) based on functions. The CU provides the AMF and the UPF with interfaces which may be configured to establish a session connection to the AMF and receive a data packet delivered by the UPF. In addition, an interface exists between the CU and the DU, and is mainly configured to control and coordinate a plurality of DUs inside the base station device. In embodiments of the present invention, a function of controlling and coordinating a data packet by the CU for the DU is mainly applied. An interface exists between the DU and the CU, and a function of the interface is mainly used to receive a data packet delivered by the CU. In addition, an interface also exists between the DU and the terminal device, and the interface is used to send, to the terminal device, the data packet received from the CU. Furthermore, the base station may communicate with terminal devices 1 to 6, or may communicate with terminal devices 1 to 6 through a relay station. The terminal devices 1 to 6 may communicate with a plurality of base stations using different technologies. For example, the terminal devices may communicate with a base station supporting an LTE network, may communicate with a base station supporting a 5G network, or may support a dual connection to a base station supporting an LTE network and a base station supporting a 5G network. Each of the terminal devices 1 to 6 is also referred to as user equipment (UE), a mobile station (MS), a mobile terminal (MT), a terminal, or the like, and is a device that provides voice and/or data connectivity for a user, or is a chip disposed in a device, for example, a handheld device or a vehicle-mounted device having a wireless connection function. Currently, for example, the terminal device is a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote surgery, a wireless terminal in a smart grid, a wireless terminal in transportation safety, a wireless terminal in a smart city, or a wireless terminal in a smart home.

It should be noted that the "AMF" is merely a general term for a device performing the access and mobility management function, and does not specifically indicate one or some devices. During actual application, the device performing the access and mobility management function may not be referred to as the "AMF", but may have another name for replacement. This is not specifically limited herein. In embodiments of this application, "AMF" is only used as an example for description.

Likewise, the "UPF" is merely a general term for a device performing the user plane function, and does not specifically indicate one or some devices. During actual application, the device performing the user plane function may not be referred to as the "UPF", but may have another name for replacement. This is not specifically limited herein. In embodiments of this application, "UPF" is only used as an example for description.

During actual application, the AMF and the UPF may be separate devices, or may be a group of function entities on another device (for example, a server). This is not specifically limited herein.

For ease of understanding, some terms or concepts in embodiments of this application are explained herein.

Multicast over the air interface may use a multicast manner to consume only one copy of air interface resources to ensure high air interface efficiency, to meet a requirement that a plurality of users on a network watch same content at the same time. Initial multicast is a multimedia broadcast multicast service (MBMS), where a plurality of cells that are geographically close belong to a same multimedia broadcast multicast service single frequency network (MBSFN) area in a centralized manner, and all the cells belonging to the same MBSFN area need to broadcast same content on a same time-frequency resource at a same moment, to ensure that an edge terminal device can simultaneously receive signals from the plurality of cells, combine gains, and improve reception reliability. However, an MBMS system based on an MBMSF area is statically divided and cannot change dynamically. Therefore, for some small-scale group communication requirements, for example, broadcast or multicast in only one cell, these services are still broadcast in all the cells in the entire MBSFN area even if terminal devices in most of the cells do not have a requirement of receiving these services. Therefore, an enhanced single-cell point-to-multipoint (single cell to multicast transmission, SCP™) transmission solution based on cell multicast and broadcast is proposed. SCP™ is a multicast/broadcast mechanism based on a single cell. Compared with that only one terminal receives a service in a conventional single-cell unicast mechanism, in SCP™, data can be sent to all terminals that want to receive the same service in a single cell, and only one copy of air interface resources is consumed. Therefore, SCP™ has high air interface efficiency compared with a unicast manner in which a copy of unicast data with the same content is sent to each user in a cell to cause a plurality of unicast users to consume a plurality of copies of air interface resources. SCP™ uses a group identifier, a group radio network temporary identifier (group radio network temporary identifier, G-RNTI), for scrambling at a PHY layer, and the unicast manner uses a cell radio network temporary identifier (cell radio network temporary identifier, C-RNTI) for scrambling at the PHY layer.

Figure 2:
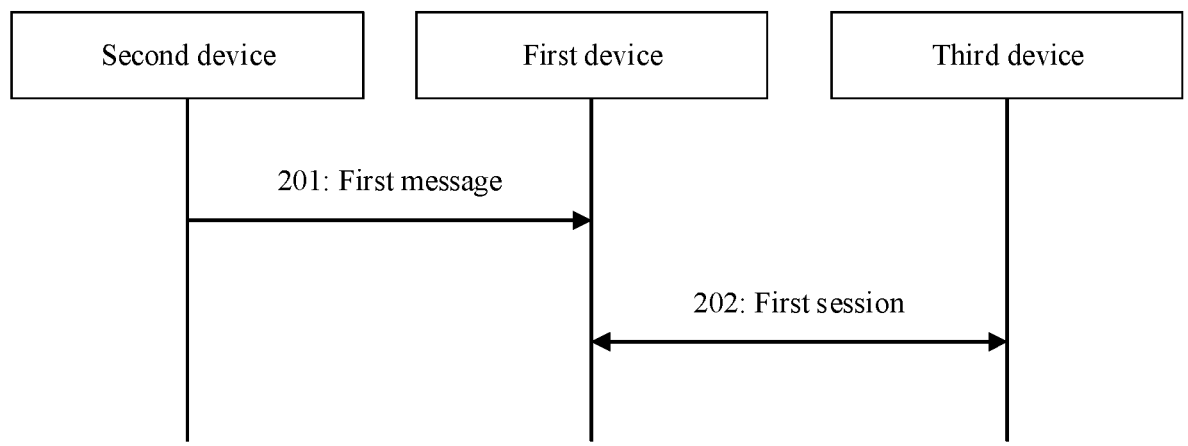
FIG. 2 is a schematic diagram of an embodiment of a session establishment method according to an embodiment of this application.

For ease of understanding, refer to FIG. 2. FIG. 2 is a schematic diagram of an embodiment of a session establishment method according to an embodiment of this application. The method mainly includes the following steps.

201: A first device receives a first message sent by a second device.

The first device receives the first message sent by the second device, and the first device can trigger step 202 based on the first message. In addition, the first message further carries a first identifier and a second identifier, and the second identifier may indicate information about a group to which the first identifier belongs.

202: The first device establishes a first session with a third device.

The first message in step 201 is used to trigger the first device to establish the first session with the third device. In addition, the first device may receive, by using the first session, a data packet sent by the third device.

Figure 3:
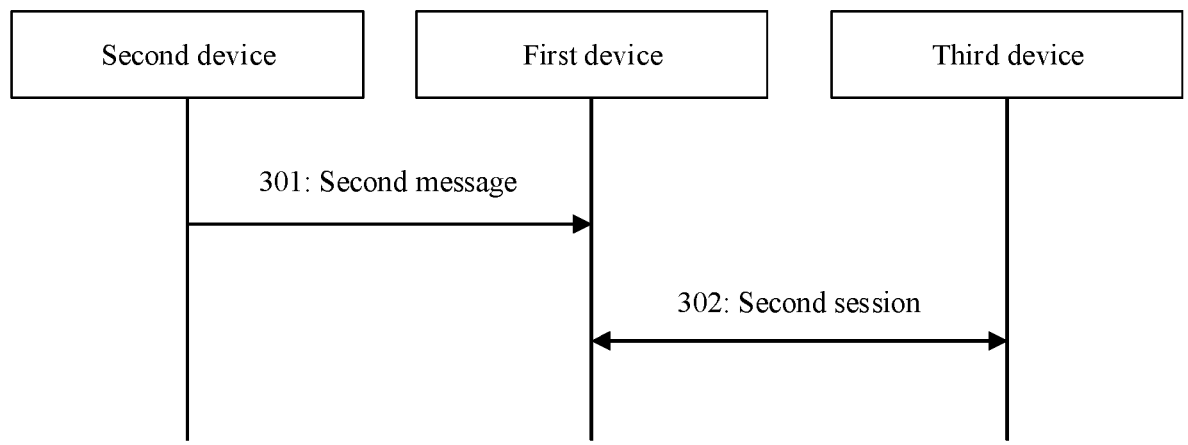
FIG. 3 is a schematic diagram of another embodiment of a session establishment method according to an embodiment of this application.

Alternatively, another type of session may be established between the first device and the third device. Refer to FIG. 3. FIG. 3 is a schematic diagram of another embodiment of a session establishment method according to an embodiment of this application. The method mainly includes the following steps.

301: The first device receives a second message sent by a second device.

The first device receives the second message sent by the second device, and the first device can trigger step 302 based on the second message. In addition, the second message further carries a third identifier, a second identifier, and a first list. The first list is a set of fourth identifiers, and the fourth identifier is an identifier corresponding to a fourth device. The third identifier is in a one-to-one correspondence with the fourth identifier in the first list, and the second identifier may indicate information about a group to which the fourth identifier in the first list belongs.

302: The first device establishes a second session with the third device.

The second message in step 301 is used to trigger the first device to establish the second session with the third device. In addition, the first device may receive, by using the second session, a data packet sent by the third device.

Figure 4:
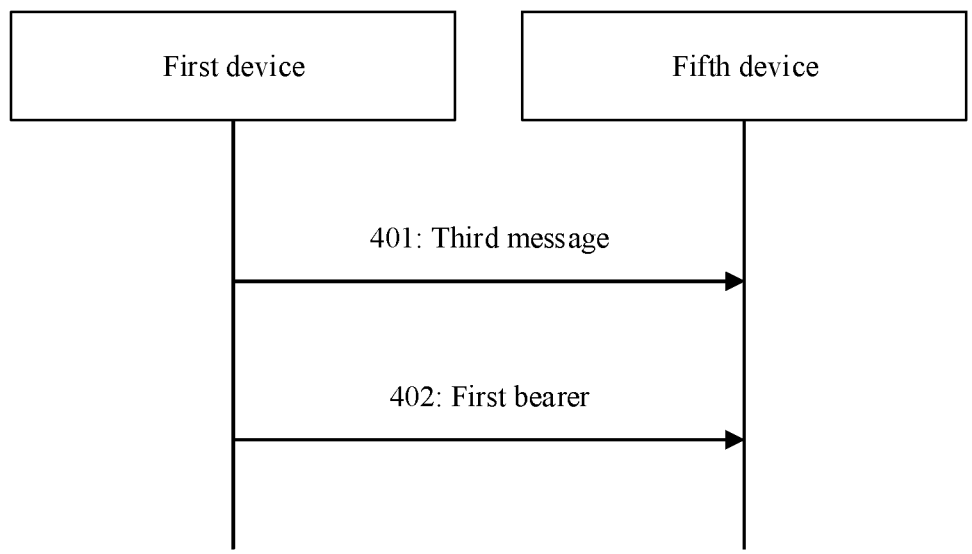
FIG. 4 is a schematic diagram of an embodiment of a bearer establishment method according to an embodiment of this application.

Further, refer to FIG. 4. FIG. 4 is a schematic diagram of an embodiment of a bearer establishment method according to an embodiment of this application. The method mainly includes the following steps.

401: A first device sends a third message to a fifth device.

The first device sends the third message to the fifth device, and step 402 may be triggered by using the third message. In addition, the third message further carries a fifth identifier and a second identifier, and the second identifier may indicate information about a group to which a fourth identifier belongs.

402: The first device establishes a first bearer with the fifth device.

The third message in step 401 is used to trigger the first device to establish the first bearer with the fifth device. In addition, the first device may send a data packet to the fifth device by using the first bearer.

Figure 5:
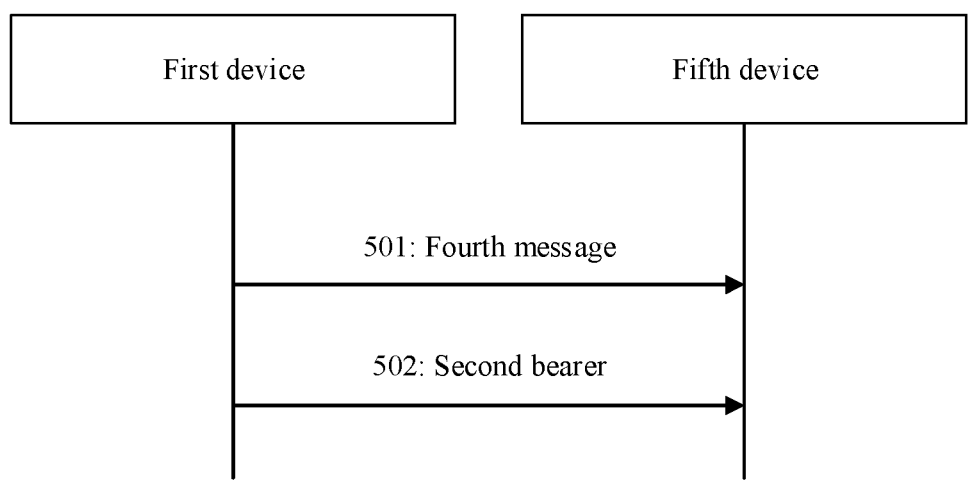
FIG. 5 is a schematic diagram of another embodiment of a bearer establishment method according to an embodiment of this application.

Alternatively, another type of bearer may be established between the first device and the fifth device. Refer to FIG. 5. FIG. 5 is a schematic diagram of another embodiment of a bearer establishment method according to an embodiment of this application. The method mainly includes the following steps.

501: The first device sends a fourth message to the fifth device.

The first device sends the fourth message to the fifth device, and step 502 may be triggered by using the fourth message. In addition, the third message further carries a seventh identifier, a second identifier, and a first list. The first list is a set of fourth identifiers, and the fourth identifier is an identifier corresponding to a fourth device. The seventh identifier is in a one-to-one correspondence with the fourth identifier in the first list, and the second identifier may indicate information about a group to which the fourth identifier in the first list belongs.

502: The first device establishes a second bearer with the fifth device.

The fourth message in step 502 is used to trigger the first device to establish the second bearer with the fifth device. In addition, the first device may send a data packet to the fifth device by using the second bearer.

Figure 6:
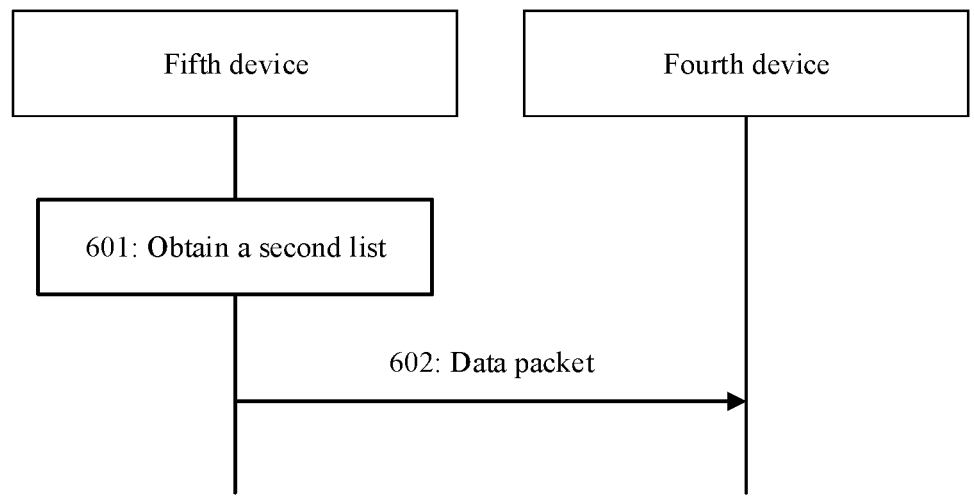
FIG. 6 is a schematic diagram of an embodiment of a data transmission method according to an embodiment of this application.

Further, refer to FIG. 6. FIG. 6 is a schematic diagram of an embodiment of a data transmission method according to an embodiment of this application. The method mainly includes the following steps.

601: A fifth device obtains a second list.

The fifth device obtains the second list, an identifier corresponding to a fourth device is a fourth identifier, a set of fourth identifiers is a first list, and a second identifier may indicate information about a group to which the fourth identifier in the first list belongs. In addition, the second list may be used to determine the fourth device based on the information that is about the group to which the fourth identifier belongs and that is indicated by the second identifier.

602: The fifth device sends a data packet to the fourth device.

The fifth device sends the data packet to the fourth device by using the second list obtained in step 601.

Figure 7:
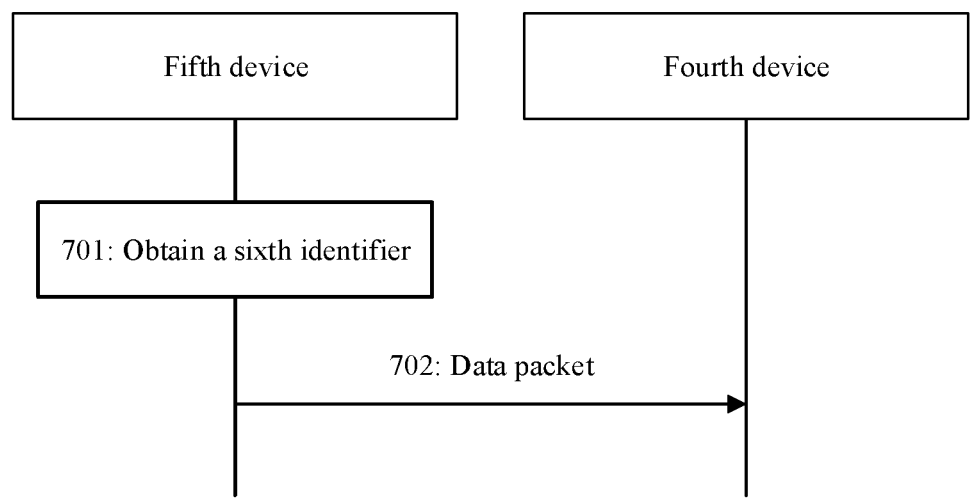
FIG. 7 is a schematic diagram of another embodiment of a data transmission method according to an embodiment of this application.

Alternatively, the fifth device sends the data packet to the fourth device in another manner. Refer to FIG. 7. FIG. 7 is a schematic diagram of another embodiment of a data transmission method according to an embodiment of this application. The method mainly includes the following steps.

701: The fifth device obtains a sixth identifier.

The fifth device obtains the sixth identifier, an identifier corresponding to the fourth device is a fourth identifier, a set of fourth identifiers is a first list, and a second identifier may indicate information about a group to which the fourth identifier in the first list belongs. In addition, the sixth identifier may be used to determine the fourth device based on the information that is about the group to which the fourth identifier belongs and that is indicated by the second identifier.

702: The fifth device sends a data packet to the fourth device.

The fifth device sends the data packet to the fourth device by using the sixth identifier obtained in step 701.

To better understand and implement the foregoing solutions in embodiments of this application, the following uses corresponding application scenarios as examples for specific description.

In embodiments of this application, an example in which the first device may be a centralized unit (CU), the second device may be an access and mobility management function (AMF), the third device may be a user plane function (UPF), the fourth device may be a terminal device, and the fifth device may be a distributed unit (DU) is used for description. During actual application, devices that perform the same functions as the first device to the fifth device may have other names for replacement. This is not specifically limited herein.

In addition, in embodiments of this application, an example in which the first session may be a user equipment protocol data unit session (user equipment PDU session, UE PDU session), the second session may be a group protocol data unit session (Group PDU session), the first bearer may be a UE data radio bearer (DRB), the second bearer may be a group data radio bearer (Group DRB), the first identifier may be a UE PDU session identifier (identity, ID), the second identifier may be a vlan ID, the third identifier may be a group PDU session ID, the fourth identifier may be a terminal device ID, the fifth identifier may be a UE DRB ID, the sixth identifier may be a group radio network temporary identifier (G-RNTI), the seventh identifier may be a group DRB ID, the first list may be a terminal device ID list, and the second list may be a cell radio network temporary identifier (C-RNTI) list is used for description. During actual application, a session, a bearer, an identifier, a list, and a message that have the same functions may have other names for replacement. This is not specifically limited herein.

Further, when a plurality of terminal devices need to receive a data packet, if the data packet is transmitted between a CU and a UPF, between a CU and a DU, and between a DU and a terminal device in a multicast manner for at least one time, data packet transmission efficiency can be improved.

It should be noted that the data packet may be transmitted between the CU and the UPF in a multicast manner or in a unicast manner. The following separately describes the two manners.

I. The Data Packet is Transmitted Between the CU and the UPF in a Multicast Manner In this embodiment, the data packet may be transmitted between the CU and the DU in a multicast or unicast manner, and the data packet may also be transmitted between the DU and the terminal device in a multicast or unicast manner. It may be understood that during actual application, there may be a plurality of combinations of a manner in which the data packet is transmitted between the CU and the DU and a manner in which the data packet is transmitted between the DU and the terminal device. The following provides descriptions separately.

1. The Data Packet is Transmitted Between the CU and the DU in a Multicast Manner and the Data Packet is Transmitted Between the DU and the Terminal Device in a Multicast Manner.

Figure 8:
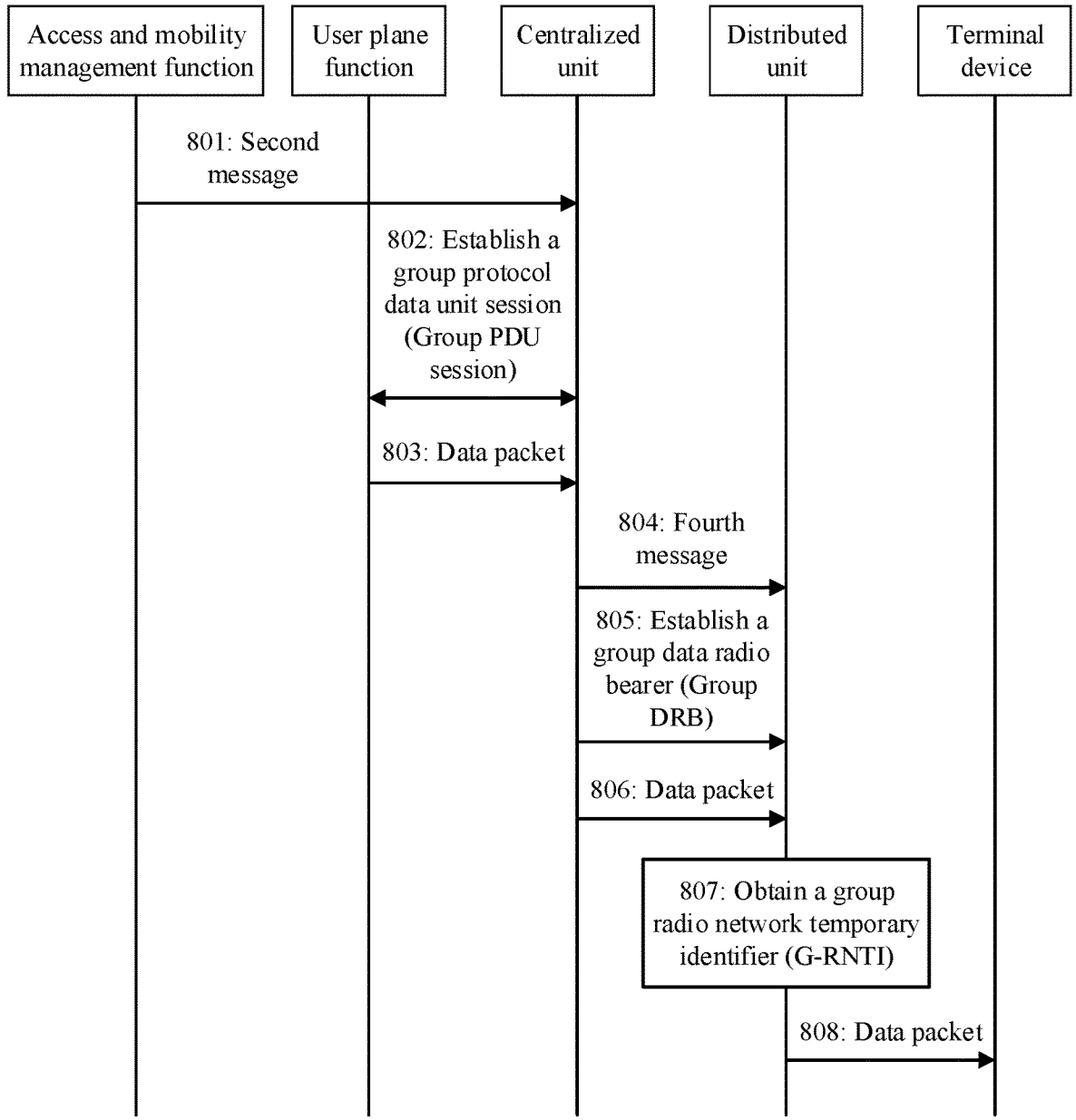
FIG. 8 is a schematic diagram of another embodiment of a data transmission method according to an embodiment of this application.

In this embodiment, the CU receives a data packet that is sent by the UPF in a multicast manner by using the group PDU session; the CU sends the data packet to the DU in a multicast manner by using the group DRB; and the DU sends the data packet to the terminal device in a multicast manner through scrambling by using a G-RNTI. For ease of understanding, refer to FIG. 8. FIG. 8 is a schematic diagram of another embodiment of a data transmission method according to an embodiment of this application. The method mainly includes the following steps.

801: The AMF sends a second message to the CU.

The AMF needs to send the second message to the CU, and the CU can trigger step 802 based on the second message. In addition, the second message carries a group PDU session ID, a vlan ID, and a terminal device ID list. The group PDU session ID is in a one-to-one correspondence with a terminal device ID in the terminal device ID list, and the vlan ID may indicate that the terminal device ID belongs to a same group. To be specific, if one or more terminal device IDs correspond to a same vlan ID, the one or more terminal device IDs belong to a same group.

802: The CU establishes a group PDU session with the UPF.

Subsequently, the CU establishes the group PDU session with the UPF based on the second message received in step 801. The established group PDU session may be used in step 803.

803: The UPF sends a data packet to the CU.

Further, the UPF may send the data packet to the CU in a multicast manner by using the group PDU session established in step 802.

It may be understood that a manner in which the CU obtains the vlan ID may not only be described in step 801, but may also be that the CU obtains the vlan ID from the AMF or the UPF when the CU establishes the group PDU session with the UPF. This is not specifically limited herein.

It can be learned from step 801 that the group PDU session ID is in a one-to-one correspondence with the terminal device ID in the terminal device ID list, and the vlan ID may indicate that the terminal device ID belongs to the same group. If the terminal device ID corresponding to the group PDU session belongs to the same group as indicated by the vlan ID, the UPF may consider that a plurality of terminal devices belonging to a same group need to receive a same data packet. In this case, the UPF does not need to make a plurality of copies of the data packet and then send the plurality of copies of the data packet to the CU by using a plurality of sessions, but can send only one copy of the data packet to the CU by using the group PDU session. This reduces channel transmission resources and improves data transmission efficiency.

804: The CU sends a fourth message to the DU.

The CU sends the fourth message to the DU, and then step 805 may be triggered by using the fourth message. In addition, the fourth message carries a group DRB ID, a vlan ID, and a terminal device ID list. The group DRB ID is associated with a terminal device ID in the terminal device ID list, and the vlan ID may indicate that the terminal device ID belongs to a same group.

805: The CU establishes a group DRB with the DU.

Subsequently, the CU establishes the group DRB with the DU based on the fourth message received in step 804. The established group DRB may be used in step 806.

It should be noted that there is no time sequence between step 801 to step 803 and step 804 and step 805, provided that step 803 is performed before step 806 in a time sequence. For example, the CU may simultaneously perform step 801 to step 803 and step 804 and step 805, or first perform step 804 and step 805, and then perform step 801 to step 803. This is not limited herein.

806: The CU sends the data packet to the DU.

Further, the CU may send the data packet to the DU by using the group DRB established in step 805.

It can be learned from step 804 that the group DRB is in a one-to-one correspondence with the terminal device ID in the terminal device ID list, and the vlan ID may indicate that the terminal device ID belongs to the same group. If the terminal device ID corresponding to the group DRB belongs to the same group as indicated by the vlan ID, similar to step 803, the CU may consider that a plurality of terminal devices belonging to a same group need to receive a same data packet, and then send a copy of the data packet to the CU by using the group DRB. This reduces channel transmission resources and improves data transmission efficiency.

807: The DU obtains a G-RNTI.

After the DU receives the data packet through step 806, the DU may obtain the G-RNTI in different manners. The following is an example:

the DU may generate a G-RNTI, and send a G-RNTI configuration message and corresponding group information to the CU through an F1 interface, so that the CU obtains the G-RNTI generated by the DU and the corresponding group information; or the CU may generate a G-RNTI, and then the DU receives a G-RNTI configuration message and corresponding group information that are sent by the CU through an F1 interface, and obtains the G-RNTI generated by the CU and the corresponding group information.

Further, the DU may send a radio resource control (RRC) message, a system information block (SIB) message, a service data adaptation protocol (SDAP) message, a radio link control (RLC) message, a packet data convergence protocol (PDCP) message, a media access control (media access control layer, MAC) message, or a physical layer (PHY) message to the terminal device through a universal terrestrial radio access network and user to network interface (universal terrestrial radio access network and user to network interface, Uu), so that the terminal device receives the G-RNTI based on any one of the foregoing messages. Optionally, the terminal device may alternatively receive an RRC message, a SIB message, an SDAP message, an RLC message, a PDCP message, a MAC message, or a PHY message that is sent by the CU through the Uu interface, and receive the G-RNTI based on any one of the foregoing messages, so that the terminal device can receive, in step 808, the data packet that is sent by the DU through scrambling by using the G-RNTI.

808: The DU sends the data packet to the terminal device.

Finally, the DU may send the data packet to the terminal device in a manner of scrambling by using the G-RNTI.

Further, before the DU sends the data packet to the terminal device in the manner of scrambling by using the G-RNTI, the terminal device may receive a multicast receiving notification sent by the DU, so that the terminal device can receive, by using the G-RNTI, the data packet sent by the DU; or the terminal device may receive a multicast receiving notification sent by the CU, so that the terminal device can receive, by using the G-RNTI, the data packet sent by the DU.

Optionally, that the DU sends data in a multicast manner may be determined by the DU, and a second notification message is further sent to the CU, to notify the CU that the DU sends the data to the terminal device in a multicast manner; or that the DU sends data in a multicast manner may be determined by the CU, and the DU may determine, based on a notification message sent by the CU, to send the data to the terminal device in a multicast manner.

In addition, after receiving the second notification message, the CU may send a response reply or a reject reply to the DU. During actual application, the CU may alternatively send an accept reply. This is not limited herein. Alternatively, after receiving the notification message, the DU may send, to the CU, different replies similar to the replies that are sent by the CU after the CU receives the second notification message. Details are not described herein again.

Specifically, in this embodiment, when the DU sends the data packet to the terminal device by using the G-RNTI, a correspondence among the G-RNTI, the vlan ID, and the terminal device ID is required.

For example, in this embodiment, the correspondence among the G-RNTI, the vlan ID, and the terminal device ID may be shown in Table 1. It should be noted that Table 1 is only an example of the correspondence among the G-RNTI, the vlan ID, and the terminal device ID. During actual application, the correspondence may be in another manner. This is not specifically limited herein.

TABLE 1

|  | Terminal device ID = 1 | Terminal device ID = 2 |
| --- | --- | --- |
| vlan ID = 1 | G-RNTI = 1 |  |
| vlan ID = 2 | G-RNTI = 2 |  |
| vlan ID = 3 |  | G-RNTI = 3 |

Specifically, in this embodiment, as shown in Table 1, when a data packet obtained by the DU by using a group DRB needs to be sent to a terminal device whose terminal device ID is 1, and a vlan ID is 1, the DU may send the data packet to the terminal device by using a G-RNTI that is 1, and the terminal device may receive the data packet by using the G-RNTI that is 1. Alternatively, when a data packet obtained by the DU by using a group DRB needs to be sent to a terminal device whose terminal device ID is 1, and a vlan ID is 2, the DU may send the data packet to the terminal device by using a G-RNTI that is 2, and the terminal device may receive the data packet by using the G-RNTI that is 2. Alternatively, when a data packet obtained by the DU by using a group DRB needs to be sent to a terminal device whose terminal device ID is 2, and a vlan ID is 3, the DU may send the data packet to the terminal device by using a G-RNTI that is 3, and the terminal device may receive the data packet by using the G-RNTI that is 3.

In this embodiment, the CU may establish the group PDU session with the UPF by using the second message sent by the AMF, and the UPF sends the data packet to the CU in a multicast manner by using the group PDU session. Then, after receiving the data packet sent by the UPF in a multicast manner, the CU sends the data packet to the DU in a multicast manner by using the group DRB. Finally, after receiving the data packet sent by the CU in a multicast manner, the DU sends the data packet to the terminal device in a multicast manner by using the obtained G-RNTI. The data packet is transmitted separately between the UPF and the CU, between the CU and the DU, and between the DU and the terminal device in a multicast manner. This reduces consumption of channel resources, and improves air interface transmission efficiency, thereby improving data transmission efficiency.

2. The Data Packet is Transmitted Between the CU and the DU in a Multicast Manner and the Data Packet is Transmitted Between the DU and the Terminal Device in a Unicast Manner.

Figure 9:
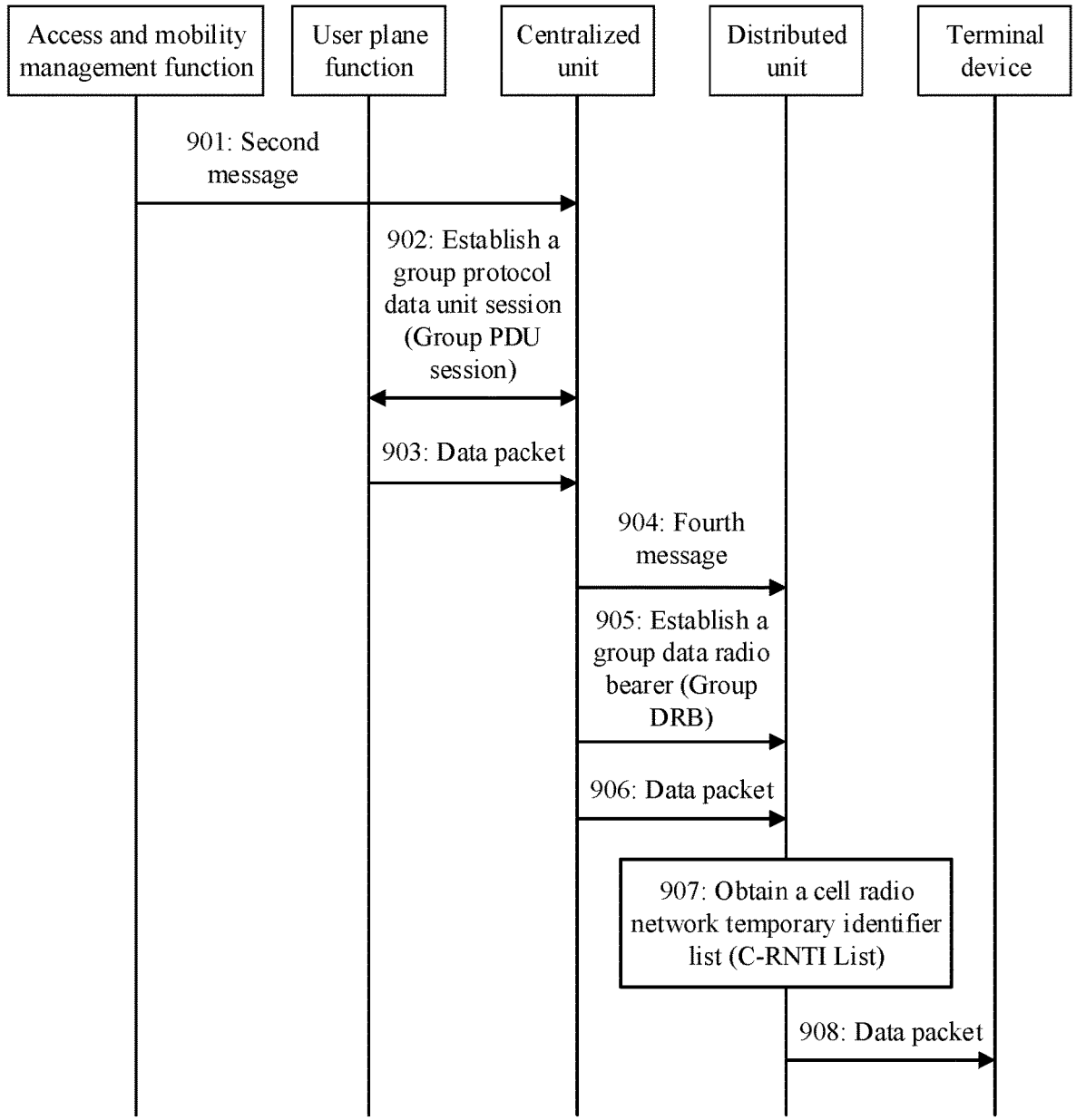
FIG. 9 is a schematic diagram of another embodiment of a data transmission method according to an embodiment of this application.

In this embodiment, the CU receives a data packet that is sent by the UPF in a multicast manner by using the group PDU session; the CU sends the data packet to the DU in a multicast manner by using the group DRB; and the DU sends the data packet to the terminal device in a unicast manner through scrambling by using a C-RNTI List. For ease of understanding, refer to FIG. 9. FIG. 9 is a schematic diagram of another embodiment of a data transmission method according to an embodiment of this application. The method mainly includes the following steps.

Step 901 to step 906 in this embodiment are similar to step 801 to step 806 in the embodiment shown in FIG. 8. Details are not described again herein.

907: The DU obtains a C-RNTI List.

After the DU receives the data packet through step 906, the DU may obtain the C-RNTI List in different manners. The following is an example:

the DU may generate a C-RNTI List, and send a C-RNTI List configuration message, corresponding terminal device identifier information, and a correspondence to the CU through an F1 interface, so that the CU obtains the C-RNTI List generated by the DU; or the CU may generate a C-RNTI List, and then the DU receives a C-RNTI List configuration message, corresponding terminal device identifier information, and a correspondence that are sent by the CU through an F1 interface, and obtains the C-RNTI List generated by the CU. The terminal device identifier information may include a temporary mobile subscriber identity (TMSI), an international mobile subscriber identity (IMSI), a globally unique temporary UE identity (GUTI), or an F1 interface UE identifier. The F1 interface UE identifier includes a gNB-CU UE F1 interface identifier or a gNB-DU UE F1 interface identifier.

Further, the DU may send an RRC message, a SIB message, an SDAP message, an RLC message, a PDCP message, a MAC message, or a PHY message to the terminal device through a Uu interface, so that the terminal device receives the C-RNTI List based on any one of the foregoing messages. Optionally, the terminal device may alternatively receive an RRC message, a SIB message, an SDAP message, an RLC message, a PDCP message, a MAC message, or a PHY message that is sent by the CU through the Uu interface, and receive the C-RNTI List based on any one of the foregoing messages, so that the terminal device can receive, in step 908, the data packet that is sent by the DU through scrambling by using the C-RNTI List.

908: The DU sends the data packet to the terminal device.

Finally, the DU may send the data packet to the terminal device through scrambling by using the C-RNTI List.

Further, before the DU sends the data packet to the terminal device in a manner of scrambling by using the C-RNTI List, the terminal device may receive a unicast receiving notification sent by the DU, so that the terminal device can receive, by using the C-RNTI List, the data packet sent by the DU; or the terminal device may receive a unicast receiving notification sent by the CU, so that the terminal device can receive, by using the C-RNTI List, the data packet sent by the DU.

Optionally, that the DU sends data in a unicast manner may be determined by the DU, and a first notification message is sent to the CU, to notify the CU that the DU sends the data to the terminal device in a unicast manner; or that the DU sends data in a unicast manner may be determined by the CU, and the DU may determine, based on a notification message sent by the CU, to send the data to the terminal device in a unicast manner.

In addition, after receiving the first notification message, the CU may send a response reply or a reject reply to the DU. During actual application, the CU may alternatively send an accept reply. This is not limited herein. Alternatively, after receiving the notification message sent by the CU, the DU may send, to the CU, different replies similar to the replies that are sent by the CU after the CU receives the first notification message. Details are not described herein again.

Specifically, in this embodiment, that the DU sends data packet to the terminal device by using the C-RNTI List needs a correspondence among the C-RNTI List, the vlan ID, and the terminal device ID. The correspondence among the C-RNTI List, the vlan ID, and the terminal device ID is similar to that in Table 1, and details are not described herein again.

In this embodiment, the CU may establish the group PDU session with the UPF by using the second message sent by the AMF, and the UPF sends the data packet to the CU in a multicast manner by using the group PDU session. Then, after receiving the data packet sent by the UPF in a multicast manner, the CU sends the data packet to the DU in a multicast manner by using the group DRB. Finally, after receiving the data packet sent by the CU in a multicast manner, the DU sends the data packet to the terminal device in a unicast manner by using the obtained C-RNTI List. The data packet is transmitted between the UPF and the CU and between the CU and the DU in a multicast manner. This reduces consumption of channel resources, thereby improving data transmission efficiency.

3. The Data Packet is Transmitted Between the CU and the DU in a Unicast Manner and the Data Packet is Transmitted Between the DU and the Terminal Device in a Multicast Manner.

Figure 10:
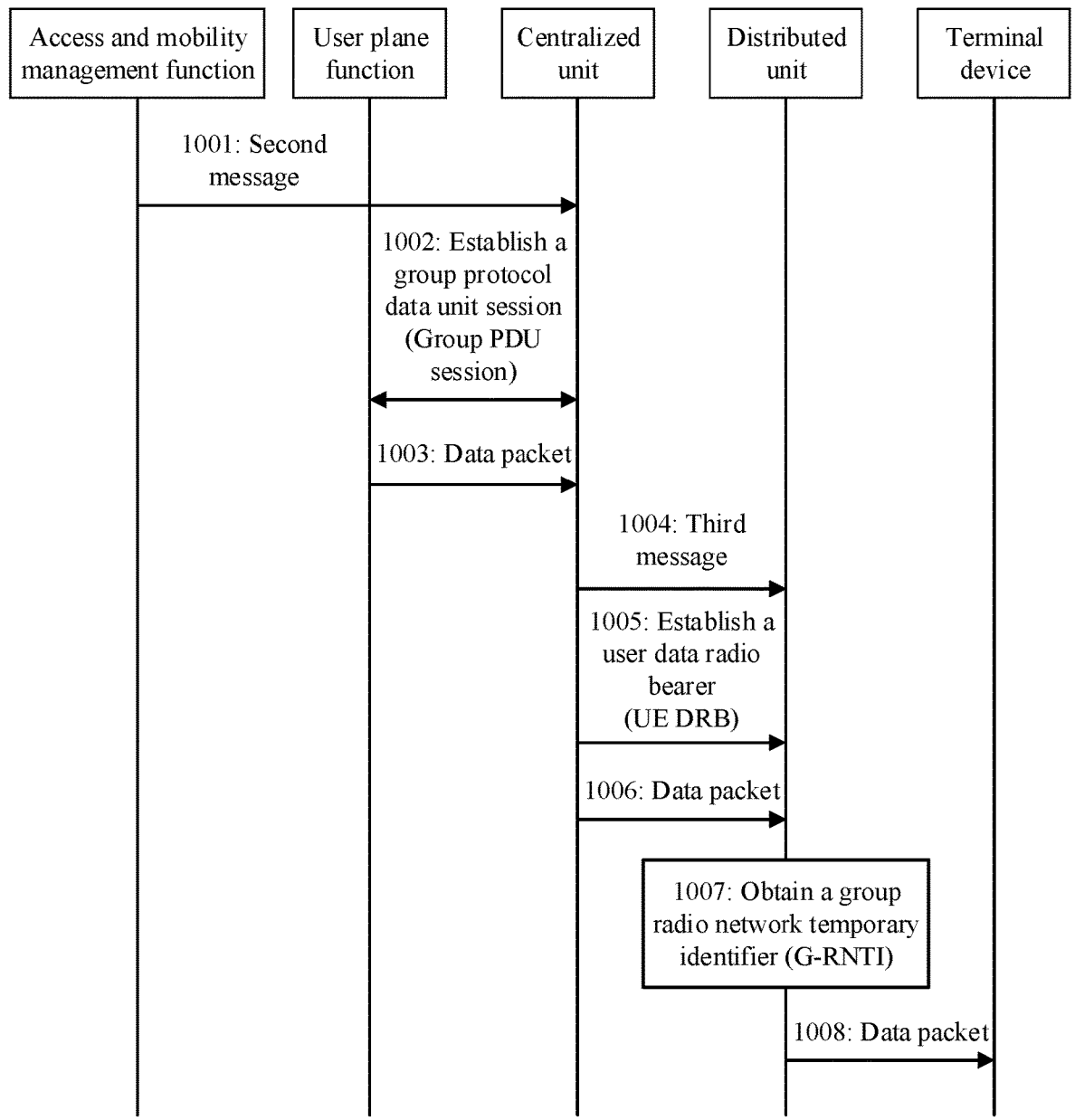
FIG. 10 is a schematic diagram of another embodiment of a data transmission method according to an embodiment of this application.

In this embodiment, the CU receives a data packet that is sent by the UPF in a multicast manner by using the group PDU session; the CU sends the data packet to the DU in a unicast manner by using the UE DRB; and the DU sends the data packet to the terminal device in a multicast manner through scrambling by using a G-RNTI. For ease of understanding, refer to FIG. 10. FIG. 10 is a schematic diagram of another embodiment of a data transmission method according to an embodiment of this application. The method mainly includes the following steps.

Step 1001 to step 1003 in this embodiment are similar to step 801 to step 803 in the embodiment shown in FIG. 8. Details are not described again herein.

1004: The CU sends a third message to the DU.

The CU sends the third message to the DU, and then step 1005 may be triggered by using the third message. In addition, the third message carries a DRB ID and a vlan ID. One DRB ID corresponds to one terminal device ID, and the vlan ID may indicate that the DRB ID belongs to a same group, that is, the vlan ID may indicate that the terminal device ID belongs to a same group.

1005: The CU establishes the UE DRB with the DU.

Subsequently, the CU establishes the UE DRB with the DU based on the third message received in step 1004. The established UE DRB may be used in step 1006.

It should be noted that there is no time sequence between step 1001 to step 1003 and step 1004 and step 1005, provided that step 1003 is performed before step 1006 in a time sequence. For example, the CU may simultaneously perform step 1001 to step 1003 and step 1004 and step 1005, or first perform step 1004 and step 1005, and then perform step 1001 to step 1003. This is not limited herein.

1006: The CU sends a data packet to the DU.

Further, the CU may send the data packet to the DU by using the UE DRB established in step 1005.

1007: The DU obtains a G-RNTI.

After the DU receives the data packet through step 1006, the DU may obtain the G-RNTI in different manners. A manner in which the DU obtains the G-RNTI is similar to that in step 807 in the embodiment shown in FIG. 8. Different manners in which the terminal device may receive the G-RNTI are similar to the manners in step 807 in the embodiment shown in FIG. 8. Details are not described herein again.

1008: The DU sends the data packet to the terminal device.

Finally, the DU may send the data packet to the terminal device through scrambling by using the G-RNTI.

Further, that the terminal device may receive a multicast receiving notification sent by the CU or the DU is similar to that in step 808 in the embodiment shown in FIG. 8. Details are not described herein again. That the DU determines, in different manners, to send the data packet to the terminal device in a multicast manner is similar to that in step 808 in the embodiment shown in FIG. 8. Details are not described herein again.

Then, that the DU sends the data packet to the terminal device by using the G-RNTI needs a correspondence among the G-RNTI, the vlan ID, and the terminal device ID. The correspondence among the G-RNTI, the vlan ID, and the terminal device ID is similar to that in Table 1, and details are not described herein again.

For example, it may be learned from step 1004 that one DRB ID corresponds to one terminal device ID, and the vlan ID may indicate that the terminal device ID belongs to the same group. If two UE DRBs corresponding to two terminal device IDs belong to a same group as indicated by the vlan ID, in other words, the DU receives two data packets by using the two UE DRBs in step 1006, it may be considered that actual content of the two data packets is the same. To be specific, the DU may select one of the two data packets as a multicast source data packet, and then send the selected multicast source data packet to the terminal device by using the G-RNTI.

Specifically, the DU may determine the multicast source data packet in the two data packets, and send a notification message to the CU, so that the CU determines the multicast source data packet based on the notification message. After determining the multicast source data packet, the CU may select to perform unicast or perform multicast by using the multicast source data packet during subsequent data packet transmission; or the CU may determine the multicast source data packet, and send a notification message to the DU, so that the DU determines the multicast source data packet in the two data packets, selects the multicast source data packet, and sends the multicast source data packet to the terminal device by using the G-RNTI. Next, the DU may select to delete or discard a non-multicast source data packet in the two data packets.

In addition, after receiving the notification message, the CU may send a response reply or a reject reply to the DU. During actual application, the CU may alternatively send an accept reply. This is not limited herein. Alternatively, after receiving the notification message, the DU may send, to the CU, different replies similar to the replies that are sent by the CU after the CU receives the notification message. Details are not described herein again.

In this embodiment, the CU may establish the group PDU session with the UPF by using the second message sent by the AMF, and the UPF sends the data packet to the CU in a multicast manner by using the group PDU session. Then, after receiving the data packet sent by the UPF in a multicast manner, the CU sends the data packet to the DU in a unicast manner by using the UE DRB. Finally, after receiving the data packet sent by the CU in a unicast manner, the DU determines a multicast source data packet in different manners, and sends the determined multicast source data packet to the terminal device in a multicast manner by using the obtained G-RNTI. The data packet is transmitted between the UPF and the CU, and between the DU and the terminal device in a multicast manner. This reduces consumption of channel resources, and improves air interface transmission efficiency, thereby improving data transmission efficiency.

4. The Data Packet is Transmitted Between the CU and the DU in a Unicast Manner and the Data Packet is Transmitted Between the DU and the Terminal Device in a Unicast Manner.

Figure 11:
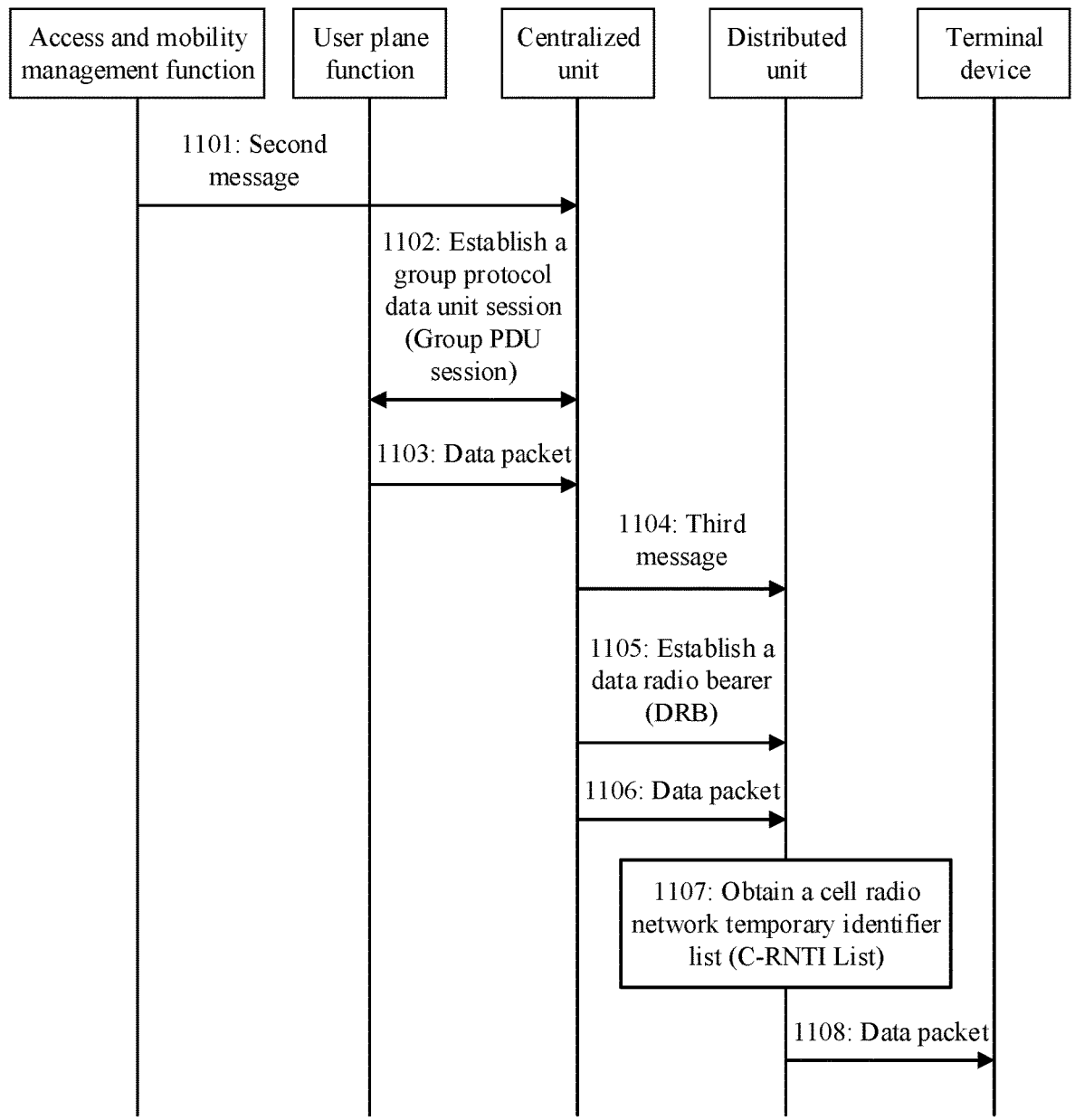
FIG. 11 is a schematic diagram of another embodiment of a data transmission method according to an embodiment of this application.

In this embodiment, the CU receives a data packet that is sent by the UPF in a multicast manner by using the group PDU session; the CU sends the data packet to the DU in a unicast manner by using the UE DRB; and the DU sends the data packet to the terminal device in a unicast manner through scrambling by using a C-RNTI List. For ease of understanding, refer to FIG. 11. FIG. 11 is a schematic diagram of another embodiment of a data transmission method according to an embodiment of this application. The method mainly includes the following steps.

Step 1101 to step 1103 in this embodiment are similar to step 801 to step 803 in the embodiment shown in FIG. 8. Details are not described again herein.

1104: The CU sends a third message to the DU.

The CU sends the third message to the DU, and then step 1105 may be triggered by using the third message. In addition, the third message carries a DRB ID and a vlan ID. One DRB ID corresponds to one terminal device ID, and the vlan ID may indicate that the terminal device ID belongs to a same group.

1105: The CU establishes the UE DRB with the DU.

Subsequently, the CU establishes the UE DRB with the DU based on the fourth message received in step 1104. The established UE DRB may be used in step 1106.

It should be noted that there is no time sequence between step 1101 to step 1103 and step 1104 and step 1105, provided that step 1103 is performed before step 1106 in a time sequence. For example, the CU may simultaneously perform step 1101 to step 1103 and step 1104 and step 1105, or first perform step 1104 and step 1105, and then perform step 1101 to step 1103. This is not limited herein.

1106: The CU sends a data packet to the DU.

Further, the CU may send the data packet to the DU by using the UE DRB established in step 1105.

1107: The DU obtains a C-RNTI List.

After the DU receives the data packet through step 1106, the DU may obtain the C-RNTI List in different manners. A plurality of manners in which the DU obtains the C-RNTI List are similar to the manners in step 907 in the embodiment shown in FIG. 9. Different manners in which the terminal device may receive the C-RNTI List are similar to the manners in step 907 in the embodiment shown in FIG. 9. Details are not described herein again.

1108: The DU sends the data packet to the terminal device.

Finally, the DU may send the data packet to the terminal device through scrambling by using the C-RNTI List.

Further, that the terminal device may receive a unicast receiving notification sent by the CU or the DU is similar to that in step 908 in the embodiment shown in FIG. 9. Details are not described herein again. That the DU determines, in different manners, to send the data packet to the terminal device in a unicast manner is similar to that in step 908 in the embodiment shown in FIG. 9. Details are not described herein again.

Then, that the DU sends the data packet to the terminal device by using the C-RNTI List needs a correspondence among the C-RNTI List, the vlan ID, and the terminal device ID. The correspondence among the C-RNTI List, the vlan ID, and the terminal device ID is similar to that in Table 1, and details are not described herein again.

In this embodiment, the CU may establish the group PDU session with the UPF by using the second message sent by the AMF, and the UPF sends the data packet to the CU in a multicast manner by using the group PDU session. Then, after receiving the data packet sent by the UPF in a multicast manner, the CU sends the data packet to the DU in a unicast manner by using the UE DRB. Finally, after receiving the data packet sent by the CU in a unicast manner, the DU sends the data packet to the terminal device in a unicast manner by using the obtained C-RNTI List. The data packet is transmitted between the UPF and the CU in a multicast manner. This reduces consumption of channel resources, thereby improving data transmission efficiency.

II. The Data Packet is Transmitted Between the CU and the UPF in a Unicast Manner.

In this embodiment, the data packet may be transmitted between the CU and the DU in a multicast or unicast manner, and the data packet may also be transmitted between the DU and the terminal device in a multicast or unicast manner. It may be understood that during actual application, there may be a plurality of combinations of a manner in which the data packet is transmitted between the CU and the DU and a manner in which the data packet is transmitted between the DU and the terminal device. The following provides descriptions separately. It may be understood that a manner in which the data packet is transmitted in a multicast manner for at least one time is mainly described in this embodiment, and therefore, a manner in which the data packet is transmitted in a unicast manner between the CU and the DU and a manner in which the data packet is transmitted in a unicast manner between the DU and the terminal device are not described in this embodiment.

1. The Data Packet is Transmitted Between the CU and the DU in a Multicast Manner and the Data Packet is Transmitted Between the DU and the Terminal Device in a Multicast Manner.

Figure 12:
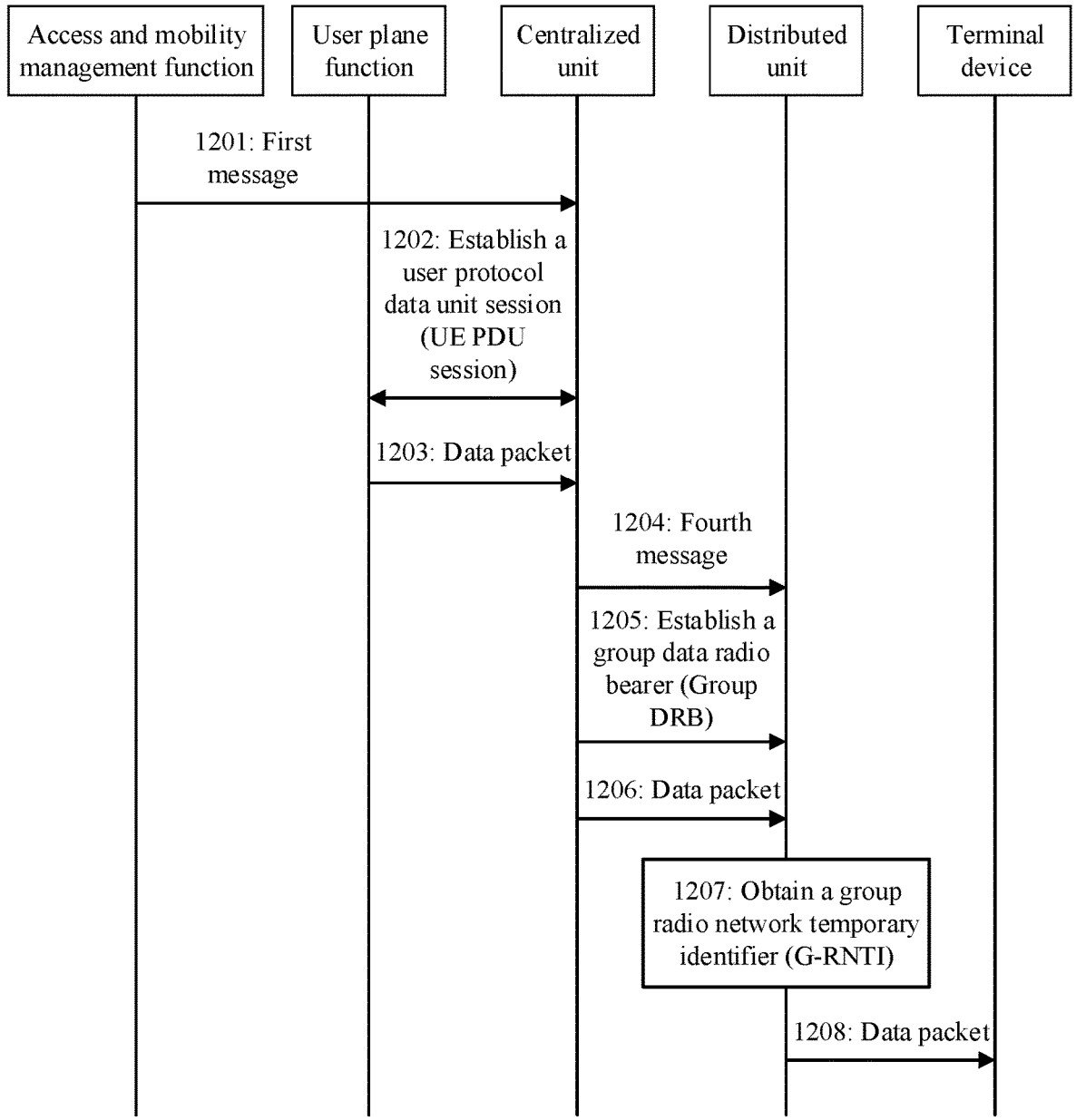
FIG. 12 is a schematic diagram of another embodiment of a data transmission method according to an embodiment of this application.

In this embodiment, the CU receives a data packet that is sent by the UPF in a unicast manner by using the UE PDU session; the CU sends the data packet to the DU in a multicast manner by using the group DRB; and the DU sends the data packet to the terminal device in a multicast manner through scrambling by using a G-RNTI. For ease of understanding, refer to FIG. 12. FIG. 12 is a schematic diagram of another embodiment of a data transmission method according to an embodiment of this application. The method mainly includes the following steps.

1201: The AMF sends a first message to the CU.

The AMF needs to send the first message to the CU, and the CU can trigger step 1202 based on the first message. In addition, the first message carries a UE PDU session ID and a vlan ID. One UE PDU session ID corresponds to one terminal device ID, and the vlan ID may indicate that the UE PDU session ID belongs to a same group, that is, the vlan ID may indicate that the terminal device ID belongs to a same group. Therefore, it can be learned that if one or more terminal device IDs correspond to a same vlan ID, the one or more terminal device IDs belong to a same group.

1202: The CU establishes the UE PDU session with the UPF.

Subsequently, the CU establishes the UE PDU session with the UPF based on the first message received in step 1201. The established UE PDU session may be used in step 1203.

1203: The UPF sends a data packet to the CU.

Further, the UPF may send the data packet to the CU in a unicast manner by using the UE PDU session established in step 1202.

1204: The CU sends a fourth message to the DU.

The CU sends the fourth message to the DU, and then step 1205 may be triggered by using the fourth message. In addition, the fourth message carries a group DRB ID, a vlan ID, and a terminal device ID list. The group DRB ID is in a one-to-one correspondence with a terminal device ID in the terminal device ID list, and the vlan ID may indicate that the terminal device ID belongs to a same group.

1205: The CU establishes a group DRB with the DU.

Subsequently, the CU establishes the group DRB with the DU based on the fourth message received in step 1204. The established group DRB may be used in step 1206.

It should be noted that there is no time sequence between step 1201 to step 1203 and step 1204 and step 1205, provided that step 1203 is performed before step 1206 in a time sequence. For example, the CU may simultaneously perform step 1201 to step 1203 and step 1204 and step 1205, or first perform step 1204 and step 1205, and then perform step 1201 to step 1203. This is not limited herein.

1206: The CU sends a data packet to the DU.

Further, the CU may send the data packet to the DU by using the group DRB established in step 1205.

For example, it may be learned from step 1204 that one UE PDU session ID corresponds to one terminal device ID, and the vlan ID may indicate that the terminal device ID belongs to the same group. If two UE PDU session IDs corresponding to two terminal device IDs belong to a same group as indicated by the vlan IDs, in other words, the UPF sends three data packets to the CU by using two UE PDU sessions in step 1203, it may be considered that actual content of the three data packets is the same. To be specific, the CU may select one of the three data packets as a multicast source data packet, and then send the selected multicast source data packet to the DU by using the group DRB.

Specifically, the AMF may determine the multicast source data packet in the two data packets, and send a notification message to the CU, so that the CU determines the multicast source data packet in the two data packets based on the notification message, and selects the multicast source data packet to be sent to the DU by using the group DRB; and the CU may select to delete or discard a non-multicast source data packet in the two data packets; or the CU may determine the multicast source data packet, and send a notification message to the AMF, so that the AMF determines the multicast source data packet based on the notification message; and after determining the multicast data packet, the AMF may select to perform unicast or perform multicast by using the multicast source data packet during subsequent data packet transmission.

In addition, after receiving the notification message, the CU may send a response reply or a reject reply to the AMF. During actual application, the CU may alternatively send an accept reply. This is not limited herein. Alternatively, after receiving the notification message, the AMF may send, to the CU, different replies similar to the replies that are sent by the CU after the CU receives the notification message. Details are not described herein again.

1207: The DU obtains a G-RNTI.

After the DU receives the data packet through step 1206, the DU may obtain the G-RNTI in different manners. The following is an example:

the DU may generate a G-RNTI, and send a G-RNTI configuration message and corresponding group information to the CU through an F1 interface, so that the CU obtains the G-RNTI generated by the DU and the corresponding group information; or the CU may generate a G-RNTI, and then the DU receives a G-RNTI configuration message and corresponding group information that are sent by the CU through an F1 interface, and obtain the G-RNTI generated by the CU and the corresponding group information.

Further, the DU may send an RRC message, a SIB message, an SDAP message, an RLC message, a PDCP message, a MAC message, or a PHY message to the terminal device through a Uu interface, so that the terminal device receives the G-RNTI based on any one of the foregoing messages. Optionally, the terminal device may alternatively receive an RRC message, a SIB message, an SDAP message, an RLC message, a PDCP message, a MAC message, or a PHY message that is sent by the CU through the Uu interface, and receive the G-RNTI based on any one of the foregoing messages, so that the terminal device can receive, in step 1208, the data packet that is sent by the DU through scrambling by using the G-RNTI.

1208: The DU sends the data packet to the terminal device.

Finally, the DU may send the data packet to the terminal device through scrambling by using the G-RNTI.

Further, before the DU sends the data packet to the terminal device in the manner of scrambling by using the G-RNTI, the terminal device may receive a multicast receiving notification sent by the DU, so that the terminal device can receive, by using the G-RNTI, the data packet sent by the DU; or the terminal device may receive a multicast receiving notification sent by the CU, so that the terminal device can receive, by using the G-RNTI, the data packet sent by the DU.

Optionally, that the DU sends data in a multicast manner may be determined by the DU, and a second notification message is sent to the CU, to notify the CU that the DU sends the data to the terminal device in a multicast manner; or that the DU sends data in a multicast manner may be determined by the CU, and the DU may determine, based on a notification message sent by the CU, to send the data to the terminal device in a multicast manner.

In addition, after receiving the second notification message, the CU may send a response reply or a reject reply to the DU. During actual application, the CU may alternatively send an accept reply. This is not limited herein. Alternatively, after receiving the notification message, the DU may send, to the CU, different replies similar to the replies that are sent by the CU after the CU receives the second notification message. Details are not described herein again.

Specifically, in this embodiment, that the DU sends the data packet to the terminal device by using the G-RNTI needs a correspondence among the G-RNTI, the vlan ID, and the terminal device ID. The correspondence among the G-RNTI, the vlan ID, and the terminal device ID is similar to that in Table 1, and details are not described herein again.

In this embodiment, the CU may establish the UE PDU session with the UPF by using the first message sent by the AMF, and the UPF sends the data packet to the CU in a unicast manner by using the UE PDU session. Then, after receiving the data packet sent by the UPF in a unicast manner, the CU sends the data packet to the DU in a multicast manner by using the group DRB. Finally, after receiving the data packet sent by the CU in a multicast manner, the DU sends the data packet to the terminal device in a multicast manner by using the obtained G-RNTI. The data packet is transmitted between the CU and the DU, and between the DU and the terminal device in a multicast manner. This reduces consumption of channel resources, and improves air interface transmission efficiency, thereby improving data transmission efficiency.

2. The Data Packet is Transmitted Between the CU and the DU in a Multicast Manner and the Data Packet is Transmitted Between the DU and the Terminal Device in a Unicast Manner.

Figure 13:
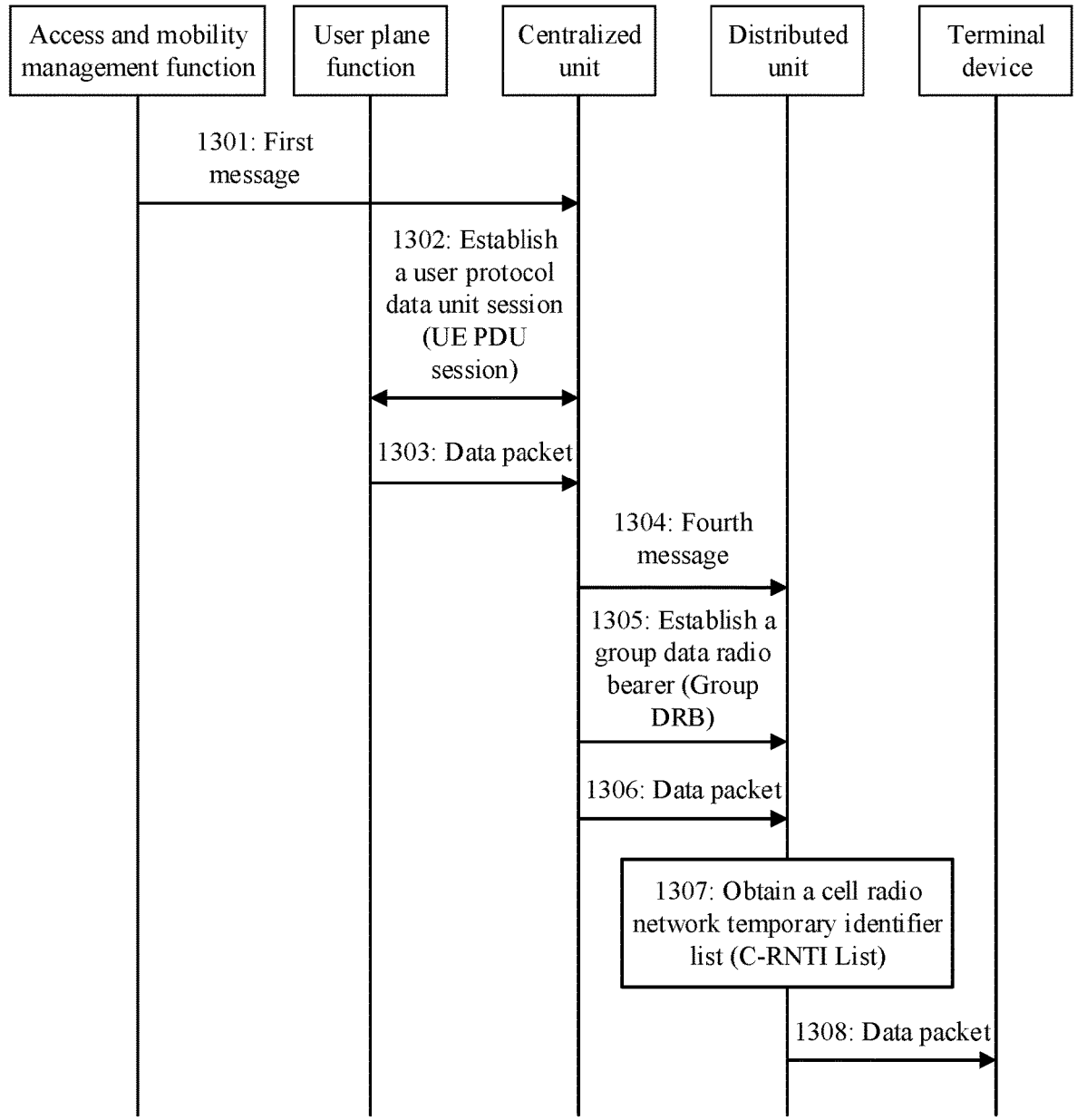
FIG. 13 is a schematic diagram of another embodiment of a data transmission method according to an embodiment of this application.

In this embodiment, the CU receives a data packet that is sent by the UPF in a unicast manner by using the UE PDU session; the CU sends the data packet to the DU in a multicast manner by using the group DRB; and the DU sends the data packet to the terminal device in a unicast manner through scrambling by using a C-RNTI List. For ease of understanding, refer to FIG. 13. FIG. 13 is a schematic diagram of another embodiment of a data transmission method according to an embodiment of this application. The method mainly includes the following steps.

Step 1301 to step 1306 in this embodiment are similar to step 1201 to step 1206 in the embodiment shown in FIG. 12. Details are not described again herein.

1307: The DU obtains a C-RNTI List.

After the DU receives the data packet through step 1306, the DU may obtain the C-RNTI List in different manners. The following is an example:

the DU may generate a C-RNTI List, and send a C-RNTI List configuration message, corresponding terminal device identifier information, and a correspondence to the CU through an F1 interface, so that the CU obtains the C-RNTI List generated by the DU; or the CU may generate a C-RNTI List, and then the DU receives a C-RNTI List configuration message, corresponding terminal device identifier information, and a correspondence that are sent by the CU through an F1 interface, and obtains the C-RNTI List generated by the CU. The terminal device identifier information may include a TMSI, an IMSI, a GUTI, or an F1 interface UE identifier. The F1 interface UE identifier includes a gNB-CU UE F1 interface identifier or a gNB-DU UE F1 interface identifier.

Further, the DU may send an RRC message, a SIB message, an SDAP message, an RLC message, a PDCP message, a MAC message, or a PHY message to the terminal device through a Uu interface, so that the terminal device receives the C-RNTI List based on any one of the foregoing messages. Optionally, the terminal device may alternatively receive an RRC message, a SIB message, an SDAP message, an RLC message, a PDCP message, a MAC message, or a PHY message that is sent by the CU through the Uu interface, and receive the C-RNTI List based on any one of the foregoing messages, so that the terminal device can receive, in step 1308, the data packet that is sent by the DU through scrambling by using the C-RNTI List.

1308: The DU sends the data packet to the terminal device.

Finally, the DU may send the data packet to the terminal device through scrambling by using the C-RNTI List.

Further, before the DU sends the data packet to the terminal device in a manner of scrambling by using the C-RNTI List, the terminal device may receive a unicast receiving notification sent by the DU, so that the terminal device can receive, by using the C-RNTI List, the data packet sent by the DU; or the terminal device may receive a unicast receiving notification sent by the CU, so that the terminal device can receive, by using the C-RNTI List, the data packet sent by the DU.

Optionally, that the DU sends data in a unicast manner may be determined by the DU, and a first notification message is sent to the CU, to notify the CU that the DU sends the data to the terminal device in a unicast manner; or that the DU sends data in a unicast manner may be determined by the CU, and the DU may determine, based on a notification message sent by the CU, to send the data to the terminal device in a unicast manner.

In addition, after receiving the first notification message, the CU may send a response reply or a reject reply to the DU. During actual application, the CU may alternatively send an accept reply. This is not limited herein. Alternatively, after receiving the notification message sent by the CU, the DU may send, to the CU, different replies similar to the replies that are sent by the CU after the CU receives the first notification message. Details are not described herein again.

Specifically, in this embodiment, that the DU sends the data packet to the terminal device by using the C-RNTI List needs a correspondence among the C-RNTI List, the vlan ID, and the terminal device ID. The correspondence among the C-RNTI List, the vlan ID, and the terminal device ID is similar to that in Table 1, and details are not described herein again.

In this embodiment, the CU may establish the UE PDU session with the UPF by using the first message sent by the AMF, and the UPF sends the data packet to the CU in a unicast manner by using the UE PDU session. Then, after receiving the data packet sent by the UPF in a unicast manner, the CU determines a multicast source data packet in different manners, and then sends the determined multicast source data packet to the DU in a multicast manner by using the group DRB. Finally, after receiving the data packet sent by the CU in a multicast manner, the DU sends the data packet to the terminal device in a unicast manner by using the obtained C-RNTI List. The data packet is transmitted between the CU and the DU in a multicast manner. This reduces consumption of channel resources, thereby improving data transmission efficiency.

3. The Data Packet is Transmitted Between the CU and the DU in a Unicast Manner and the Data Packet is Transmitted Between the DU and the Terminal Device in a Multicast Manner.

Figure 14:
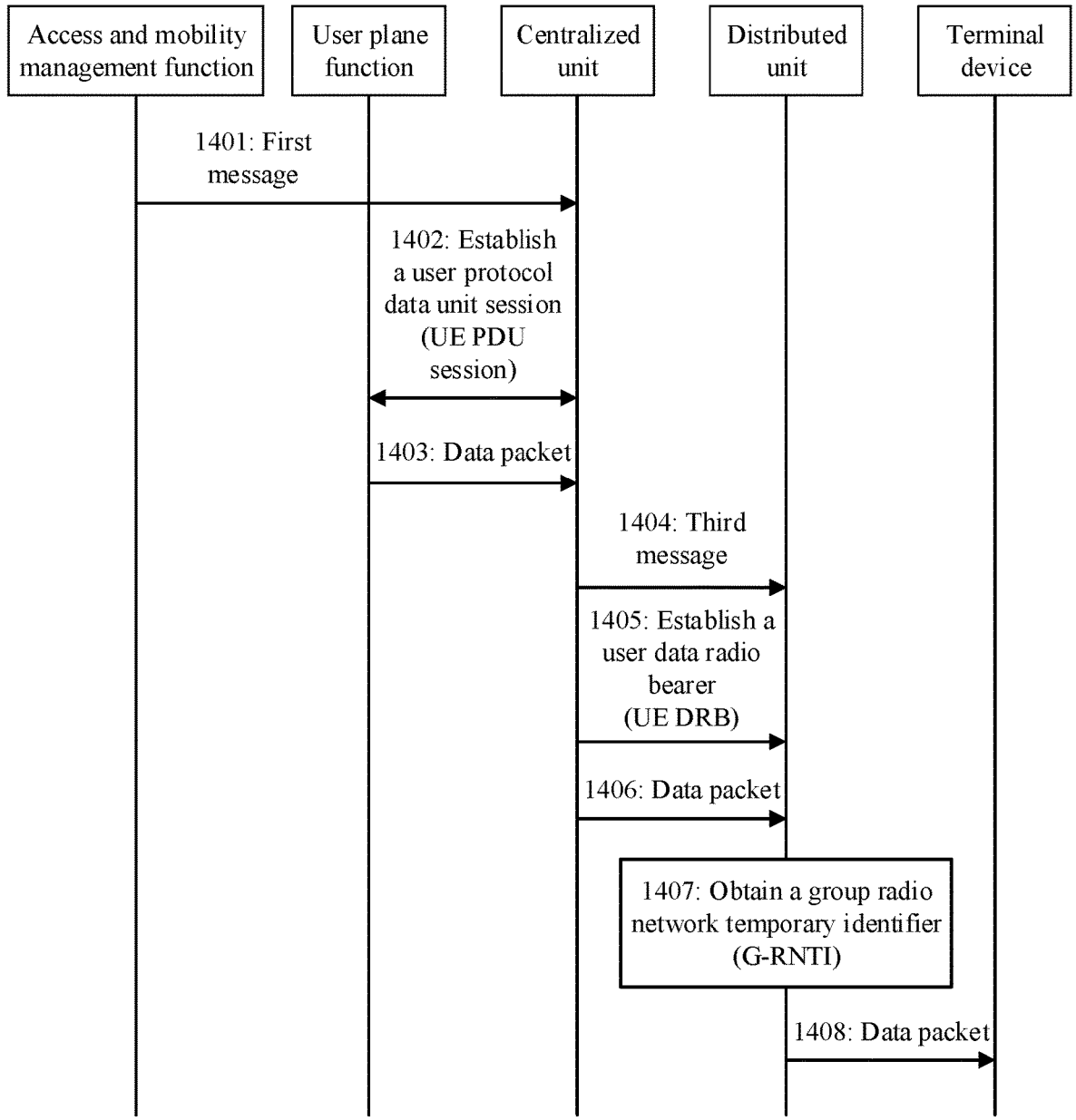
FIG. 14 is a schematic diagram of another embodiment of a data transmission method according to an embodiment of this application.

In this embodiment, the CU receives a data packet that is sent by the UPF in a unicast manner by using the UE PDU session; the CU sends the data packet to the DU in a unicast manner by using the UE DRB; and the DU sends the data packet to the terminal device in a multicast manner through scrambling by using a G-RNTI. For ease of understanding, refer to FIG. 14. FIG. 14 is a schematic diagram of another embodiment of a data transmission method according to an embodiment of this application. The method mainly includes the following steps.

Step 1401 to step 1403 in this embodiment are similar to step 1201 to step 1203 in the embodiment shown in FIG. 12. Details are not described again herein.

1404: The CU sends a third message to the DU.

The CU sends the third message to the DU, and then step 1405 may be triggered by using the third message. In addition, the third message carries a DRB ID and a vlan ID. One DRB ID corresponds to one terminal device ID, and the vlan ID may indicate that the DRB ID belongs to a same group, that is, the vlan ID may indicate that the terminal device ID belongs to a same group.

1405: The CU establishes the UE DRB with the DU.

Subsequently, the CU establishes the UE DRB with the DU based on the third message received in step 1404. The established UE DRB may be used in step 1406.

It should be noted that there is no time sequence between step 1401 to step 1403 and step 1404 and step 1405, provided that step 1403 is performed before step 1406 in a time sequence. For example, the CU may simultaneously perform step 1401 to step 1403 and step 1404 and step 1405, or first perform step 1404 and step 1405, and then perform step 1401 to step 1403. This is not limited herein.

1406: The CU sends a data packet to the DU.

Further, the CU may send the data packet to the DU by using the UE DRB established in step 1405.

1407: The DU obtains a G-RNTI.

After the DU receives the data packet through step 1406, the DU may obtain the G-RNTI in different manners. A manner in which the DU obtains the G-RNTI is similar to that in step 1207 in the embodiment shown in FIG. 12. Different manners in which the terminal device may receive the G-RNTI are similar to the manners in step 1207 in the embodiment shown in FIG. 12. Details are not described herein again.

1408: The DU sends the data packet to the terminal device.

Finally, the DU may send the data packet to the terminal device through scrambling by using the G-RNTI.

Further, that the terminal device may receive a multicast receiving notification sent by the CU or the DU is similar to that in step 1208 in the embodiment shown in FIG. 12. Details are not described herein again. That the DU determines, in different manners, to send the data packet to the terminal device in a multicast manner is similar to that in step 1208 in the embodiment shown in FIG. 12. Details are not described herein again.

Then, that the DU sends the data packet to the terminal device by using the G-RNTI needs a correspondence among the G-RNTI, the vlan ID, and the terminal device ID. The correspondence among the G-RNTI, the vlan ID, and the terminal device ID is similar to that in Table 1, and details are not described herein again.

For example, it may be learned from step 1404 that one DRB ID corresponds to one terminal device ID, and the vlan ID may indicate that the terminal device ID belongs to the same group. If five UE DRBs corresponding to five terminal device IDs belong to a same group as indicated by the vlan ID, in other words, the DU receives five data packets by using the five UE DRBs in step 1406, it may be considered that actual content of the five data packets is the same. To be specific, the DU may select one of the five data packets as a multicast source data packet, and then send the selected multicast source data packet to the terminal device by using the G-RNTI.

Specifically, the DU may determine the multicast source data packet in the five data packets, and send a notification message to the CU, so that the CU determines the multicast source data packet based on the notification message. After determining the multicast source data packet, the CU may select to perform unicast or perform multicast by using the multicast source data packet during subsequent data packet transmission; or the CU may determine the multicast source data packet, and send a notification message to the DU, so that the DU determines the multicast source data packet in the five data packets, selects the multicast source data packet, and sends the multicast source data packet to the terminal device by using the G-RNTI. Next, the DU may select to delete or discard a non-multicast source data packet in the five data packets.

In addition, after receiving the notification message, the CU may send a response reply or a reject reply to the DU. During actual application, the CU may alternatively send an accept reply. This is not limited herein. Alternatively, after receiving the notification message, the DU may send, to the CU, different replies similar to the replies that are sent by the CU after the CU receives the notification message. Details are not described herein again.

In this embodiment, the CU may establish the UE PDU session with the UPF by using the first message sent by the AMF, and the UPF sends the data packet to the CU in a unicast manner by using the UE PDU session. Then, after receiving the data packet sent by the UPF in a unicast manner, the CU sends the data packet to the DU in a unicast manner by using the UE DRB. Finally, after the DU receives the data packet sent by the CU in a unicast manner, the DU determines a multicast source data packet in different manners, sends the determined multicast source data packet to the terminal device in a multicast manner by using the obtained G-RNTI. The data packet is transmitted between the DU and the terminal device in a multicast manner. This improves air interface transmission efficiency, thereby improving data transmission efficiency.

The foregoing describes the data transmission methods in the embodiments of this application, and the following describes the first device in the embodiments of this application.

Figure 15:
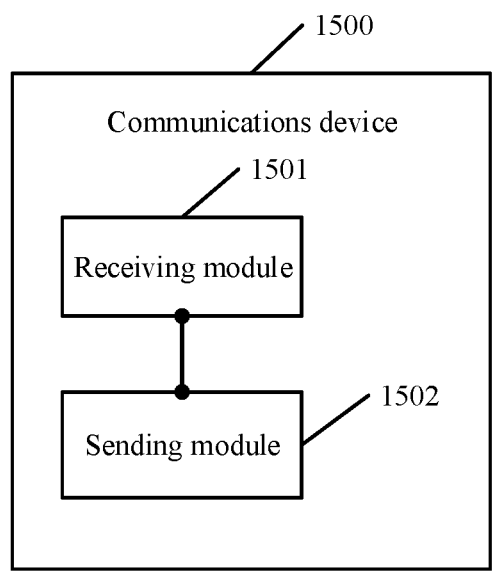
FIG. 15 is a schematic diagram of an embodiment of a communications device according to an embodiment of this application.

FIG. 15 is a schematic diagram of an embodiment of a communications device according to an embodiment of this application. The communications device 1500 includes:

a receiving module 1501, configured to receive a first message sent by a second device, where the first message is used by the first device to establish a first session with a third device, the first message carries a first identifier and a second identifier, and the second identifier indicates information about a group to which the first identifier belongs.

In an optional implementation, based on the embodiment corresponding to FIG. 15, in another embodiment of the communications device 1500 according to this embodiment of this application, the receiving module 1501 is further configured to receive a data packet that is sent by the third device by using the first session, and the data packet is marked as belonging to the group indicated by the second identifier.

In an optional implementation, based on the embodiment corresponding to FIG. 15, in another embodiment of the communications device 1500 according to this embodiment of this application, the receiving module 1501 is further configured to receive a notification message sent by the second device, and the notification message is used by the first device to determine a multicast source data packet.

In an optional implementation, based on the embodiment corresponding to FIG. 15, in another embodiment of the communications device 1500 according to this embodiment of this application, the communications device 1500 further includes a sending module 1502, configured to send a notification message to the second device, and the notification message is used by the second device to determine a multicast source data packet.

Figure 16:
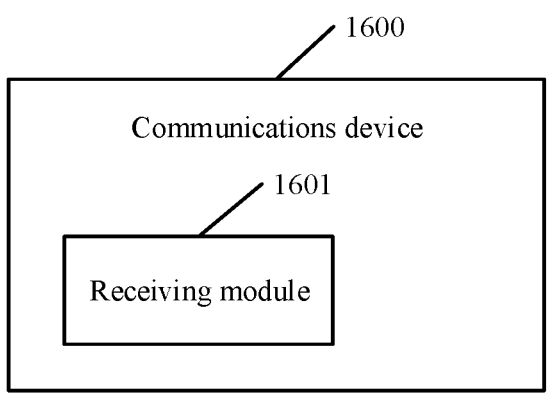
FIG. 16 is a schematic diagram of another embodiment of a communications device according to an embodiment of this application.

FIG. 16 is a schematic diagram of another embodiment of a first device according to an embodiment of this application. A communications device 1600 includes:

a receiving module 1601, configured to receive a second message sent by a second device, where the second message is used by the first device to establish a second session with a third device, the second message carries a third identifier, a second identifier, and a first list, the first list is a set of fourth identifiers, the fourth identifier is an identifier corresponding to a fourth device, the third identifier corresponds to the fourth identifier in the first list, and the second identifier indicates information about a group to which the fourth identifier in the first list belongs.

In an optional implementation, based on the embodiment corresponding to FIG. 16, in another embodiment of the communications device 1600 according to this embodiment of this application, the receiving module 1601 is further configured to receive a data packet that is sent by the third device by using the second session, and the data packet is marked as belonging to the group indicated by the second identifier.

Figure 17:
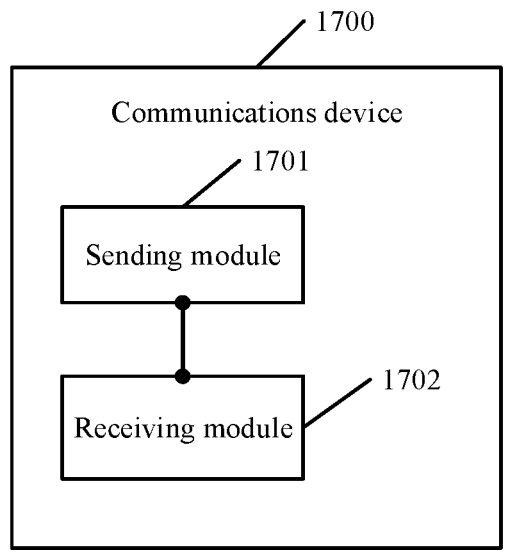
FIG. 17 is a schematic diagram of another embodiment of a communications device according to an embodiment of this application.

FIG. 17 is a schematic diagram of another embodiment of a first device according to an embodiment of this application. A communications device 1700 includes:

a sending module 1701, configured to send a third message to a fifth device, where the third message is used by the first device to establish a first bearer with the fifth device, the third message carries a fifth identifier and a second identifier, the second identifier indicates information about a group to which a fourth identifier belongs, and the fourth identifier is an identifier corresponding to a fourth device.

In an optional implementation, based on the embodiment corresponding to FIG. 17, in another embodiment of the communications device 1700 according to this embodiment of this application, the sending module 1701 is further configured to send a data packet to the fifth device by using the first bearer, and the data packet is marked as belonging to the group indicated by the second identifier.

In an optional implementation, based on the embodiment corresponding to FIG. 17, in another embodiment of the communications device 1700 according to this embodiment of this application, the communications device 1700 further includes a receiving module 1702, configured to receive a notification message sent by the fifth device, and the notification message is used by the first device to determine a multicast source data packet.

In an optional implementation, based on the embodiment corresponding to FIG. 17, in another embodiment of the communications device 1700 according to this embodiment of this application, the sending module 1701 is further configured to send a notification message to the fifth device, and the notification message is used by the fifth device to determine a multicast source data packet.

In an optional implementation, based on the embodiment corresponding to FIG. 17, in another embodiment of the communications device 1700 according to this embodiment of this application, the receiving module 1702 is further configured to receive a second list sent by the fifth device, and the second list is used by the fifth device to send a data packet to the fourth device in a unicast manner.

In an optional implementation, based on the embodiment corresponding to FIG. 17, in another embodiment of the communications device 1700 according to this embodiment of this application, the sending module 1701 is further configured to send a second list to the fifth device.

In an optional implementation, based on the embodiment corresponding to FIG. 17, in another embodiment of the communications device 1700 according to this embodiment of this application, the sending module 1701 is further configured to send a second list to the fourth device, and the second list is used by the fourth device to receive a data packet that is sent by the fifth device in a unicast manner.

In an optional implementation, based on the embodiment corresponding to FIG. 17, in another embodiment of the communications device 1700 according to this embodiment of this application, the receiving module 1702 is further configured to receive a sixth identifier sent by the fifth device, and the sixth identifier is used by the fifth device to send a data packet to the fourth device in a multicast manner.

In an optional implementation, based on the embodiment corresponding to FIG. 17, in another embodiment of the communications device 1700 according to this embodiment of this application, the sending module 1701 is further configured to send a sixth identifier to the fifth device.

In an optional implementation, based on the embodiment corresponding to FIG. 17, in another embodiment of the communications device 1700 according to this embodiment of this application, the sending module 1701 is further configured to send a sixth identifier to the fourth device, and the sixth identifier is used by the fourth device to receive a data packet that is sent by the fifth device in a multicast manner.

In an optional implementation, based on the embodiment corresponding to FIG. 17, in another embodiment of the communications device 1700 according to this embodiment of this application, the sending module 1701 is further configured to send a first notification message to the first device, and the first notification message is used to notify the first device that the fifth device sends the data packet to the fourth device in a unicast manner.

In an optional implementation, based on the embodiment corresponding to FIG. 17, in another embodiment of the communications device 1700 according to this embodiment of this application, the sending module 1701 is further configured to send a notification message to the fifth device, and the notification message is used to determine that the fifth device sends the data packet to the fourth device in a unicast manner.

Figure 18:
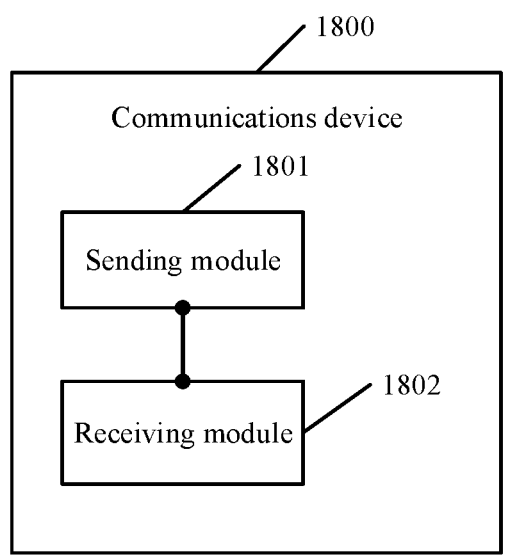
FIG. 18 is a schematic diagram of another embodiment of a communications device according to an embodiment of this application.

FIG. 18 is a schematic diagram of another embodiment of a first device according to an embodiment of this application. A communications device 1800 includes:

a sending module 1801, configured to send a fourth message to a fifth device, where the fourth message is used by the first device to establish a second bearer with the fifth device, the fourth message carries a seventh identifier, a second identifier, and a first list, the first list is a set of fourth identifiers, the fourth identifier is an identifier corresponding to a fourth device, the seventh identifier corresponds to the fourth identifier in the first list, and the second identifier indicates information about a group to which the fourth identifier in the first list belongs.

In an optional implementation, based on the embodiment corresponding to FIG. 18, in another embodiment of the communications device 1800 according to this embodiment of this application, the sending module 1801 is further configured to send a data packet to the fifth device by using the second bearer, and the data packet is marked as belonging to the group indicated by the second identifier.

In an optional implementation, based on the embodiment corresponding to FIG. 18, in another embodiment of the communications device 1800 according to this embodiment of this application, the communications device 1800 further includes a receiving module 1802, configured to receive a second list sent by the fifth device, and the second list is used by the fifth device to send a data packet to the fourth device in a unicast manner.

In an optional implementation, based on the embodiment corresponding to FIG. 18, in another embodiment of the communications device 1800 according to this embodiment of this application, the sending module 1801 is further configured to send a second list to the fifth device.

In an optional implementation, based on the embodiment corresponding to FIG. 18, in another embodiment of the communications device 1800 according to this embodiment of this application, the sending module 1801 is further configured to send a second list to the fourth device, and the second list is used by the fourth device to receive a data packet that is sent by the fifth device in a unicast manner.

In an optional implementation, based on the embodiment corresponding to FIG. 18, in another embodiment of the communications device 1800 according to this embodiment of this application, the receiving module 1802 is further configured to receive a sixth identifier sent by the fifth device, and the sixth identifier is used by the fifth device to send a data packet to the fourth device in a multicast manner.

In an optional implementation, based on the embodiment corresponding to FIG. 18, in another embodiment of the communications device 1800 according to this embodiment of this application, the sending module 1801 is further configured to send a sixth identifier to the fifth device.

In an optional implementation, based on the embodiment corresponding to FIG. 18, in another embodiment of the communications device 1800 according to this embodiment of this application, the sending module 1801 is further configured to send a sixth identifier to the fourth device, and the sixth identifier is used by the fourth device to receive a data packet that is sent by the fifth device in a multicast manner.

In an optional implementation, based on the embodiment corresponding to FIG. 18, in another embodiment of the communications device 1800 according to this embodiment of this application, the sending module 1801 is further configured to send a first notification message to the first device, and the first notification message is used to notify the first device that the fifth device sends the data packet to the fourth device in a unicast manner.

In an optional implementation, based on the embodiment corresponding to FIG. 18, in another embodiment of the communications device 1800 according to this embodiment of this application, the sending module 1801 is further configured to send a notification message to the fifth device, and the notification message is used to determine that the fifth device sends a data packet to the fourth device in a multicast manner.

The foregoing describes the first device in the embodiments of this application, and the following describes the fifth device in the embodiments of this application.

Figure 19:
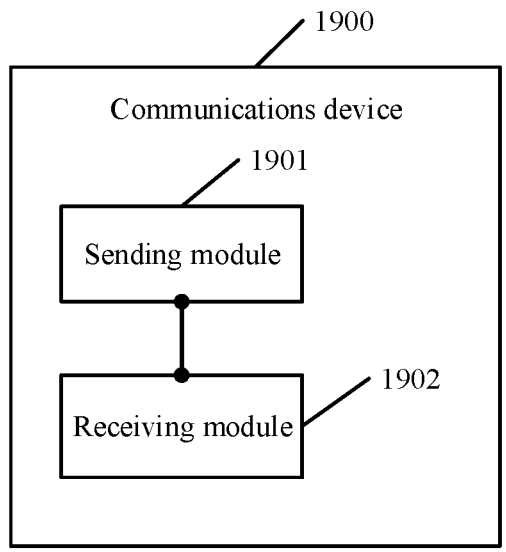
FIG. 19 is a schematic diagram of another embodiment of a communications device according to an embodiment of this application.

FIG. 19 is a schematic diagram of an embodiment of a fifth device according to an embodiment of this application. A communications device 1900 includes:

a sending module 1901, configured to send a data packet to a fourth device by using a second list, where an identifier corresponding to the fourth device is a fourth identifier, a set of the fourth identifiers is a first list, a second identifier indicates information about a group to which the fourth identifier in the first list belongs, and the second list is used to determine, based on the second identifier, the fourth device that belongs to the group to which the fourth identifier in the first list belongs.

In an optional implementation, based on the embodiment corresponding to FIG. 19, in another embodiment of the communications device 1900 according to this embodiment of this application, the communications device 1900 further includes a receiving module 1902, configured to receive a second list sent by a first device.

In an optional implementation, based on the embodiment corresponding to FIG. 19, in another embodiment of the communications device 1900 according to this embodiment of this application, the sending module 1901 is further configured to send a second list to a first device.

In an optional implementation, based on the embodiment corresponding to FIG. 19, in another embodiment of the communications device 1900 according to this embodiment of this application, the sending module 1901 is further configured to send a second list to the fourth device, and the second list is used by the fourth device to receive a data packet that is sent by the fifth device in a unicast manner.

In an optional implementation, based on the embodiment corresponding to FIG. 19, in another embodiment of the communications device 1900 according to this embodiment of this application, the receiving module 1902 is further configured to receive a notification message sent by the first device, and the notification message is used to determine that the fifth device sends the data packet to the fourth device in a unicast manner.

In an optional implementation, based on the embodiment corresponding to FIG. 19, in another embodiment of the communications device 1900 according to this embodiment of this application, the sending module 1901 is further configured to send a first notification message to the first device, and the first notification message is used to notify the first device that the fifth device sends the data packet to the fourth device in a unicast manner.

Figure 20:
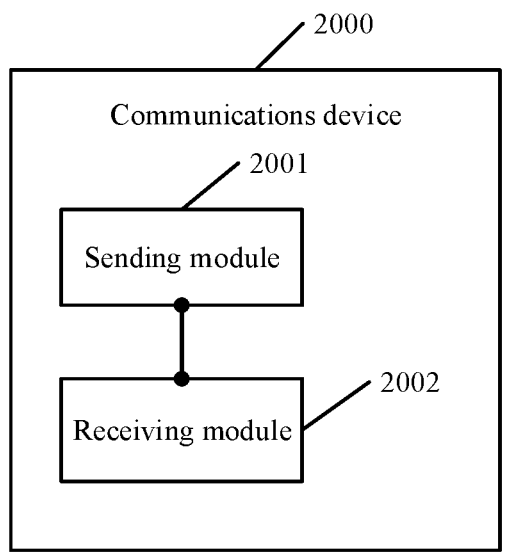
FIG. 20 is a schematic diagram of another embodiment of a communications device according to an embodiment of this application.

FIG. 20 is a schematic diagram of another embodiment of a fifth device according to an embodiment of this application. A communications device 2000 includes:

a sending module 2001, configured to send a data packet to a fourth device by using a sixth identifier, where an identifier corresponding to the fourth device is a fourth identifier, a set of fourth identifiers is a first list, a second identifier indicates information about a group to which the fourth identifier in the first list belongs, and the sixth identifier is used to determine, based on the second identifier, the fourth device that belongs to the group to which the fourth identifier in the first list belongs.

In an optional implementation, based on the embodiment corresponding to FIG. 20, in another embodiment of the communications device 2000 according to this embodiment of this application, the communications device 2000 further includes a receiving module 2002, configured to receive the sixth identifier sent by a first device.

In an optional implementation, based on the embodiment corresponding to FIG. 20, in another embodiment of the communications device 2000 according to this embodiment of this application, the sending module 2001 is further configured to send the sixth identifier to a first device.

In an optional implementation, based on the embodiment corresponding to FIG. 20, in another embodiment of the communications device 2000 according to this embodiment of this application, the sending module 2001 is further configured to send the sixth identifier to the fourth device, and the sixth identifier is used by the fourth device to receive a data packet that is sent by the fifth device in a multicast manner.

In an optional implementation, based on the embodiment corresponding to FIG. 20, in another embodiment of the communications device 2000 according to this embodiment of this application, the receiving module 2002 is further configured to receive a notification message sent by the first device, and the notification message is used to determine that the fifth device sends the data packet to the fourth device in a multicast manner.

In an optional implementation, based on the embodiment corresponding to FIG. 20, in another embodiment of the communications device 2000 according to this embodiment of this application, the sending module 2001 is further configured to send a second notification message to the first device, and the second notification message is used to notify the first device that the fifth device sends the data packet to the fourth device in a multicast manner.

In an optional implementation, based on the embodiment corresponding to FIG. 20, in another embodiment of the communications device 2000 according to this embodiment of this application, the sending module 2001 is further configured to send a notification message to the first device, and the notification message is used by the first device to determine a multicast source data packet.

In an optional implementation, based on the embodiment corresponding to FIG. 20, in another embodiment of the communications device 2000 according to this embodiment of this application, the receiving module 2002 is further configured to receive a notification message sent by the first device, and the notification message is used by the fifth device to determine a multicast source data packet.

Figure 21:
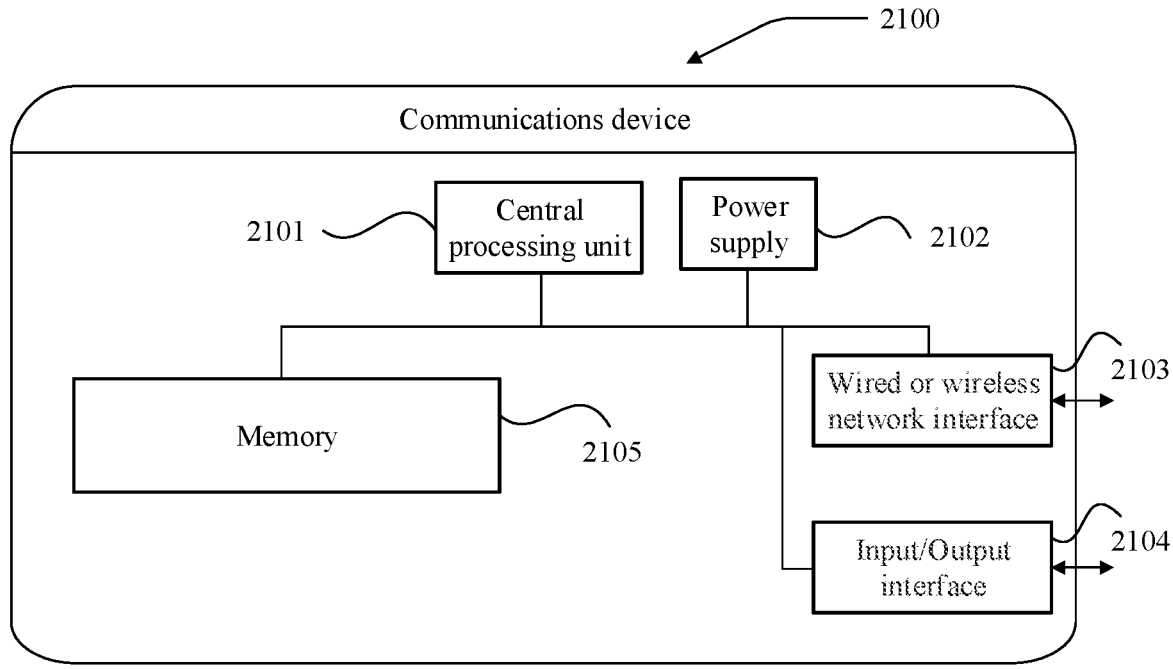
FIG. 21 is a schematic diagram of another embodiment of a communications device according to an embodiment of this application.

FIG. 21 is a schematic diagram of another embodiment of a first device according to an embodiment of this application. A communications device 2100 may include one or more central processing units (CPUs) 2101 and a memory 2105. The memory 2105 stores one or more applications or data.

The memory 2105 may be volatile storage or persistent storage. A program stored in the memory 2105 may include one or more modules, and each module may include a series of instruction operations for the first device. Further, the central processing unit 2101 may be configured to: communicate with the memory 2105, and perform, on the communications device 2100, the series of instruction operations that are in the memory 2105.

The communications device 2100 may further include one or more power supplies 2102, one or more wired or wireless network interfaces 2103, one or more input/output interfaces 2104, and/or one or more operating systems such as Windows Server™, Mac OS X™, Unix™, Linux™, and FreeBSD™.

The central processing unit 2101 may perform the operations performed by the communications device in the embodiments shown in FIG. 15 to FIG. 18. Details are not described herein again.

Figure 22:
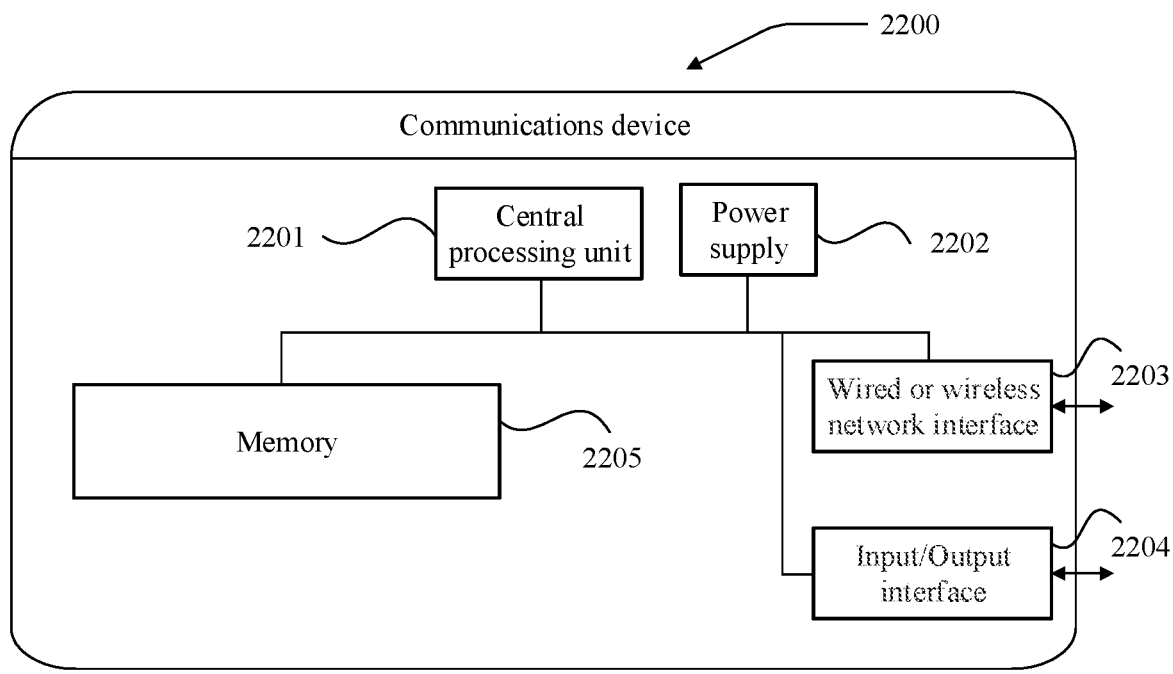
FIG. 22 is a schematic diagram of another embodiment of a communications device according to an embodiment of this application.

FIG. 22 is a schematic diagram of another embodiment of a fifth device according to an embodiment of this application. A communications device 2200 may include one or more central processing units (CPUs) 2201 and a memory 2205. The memory 2205 stores one or more applications or data.

The memory 2205 may be volatile storage or persistent storage. A program stored in the memory 2205 may include one or more modules, and each module may include a series of instruction operations for the fifth device. Further, the central processing unit 2201 may be configured to: communicate with the memory 2205, and perform, on the communications device 2200, the series of instruction operations that are in the memory 2205.

The communications device 2200 may further include one or more power supplies 2202, one or more wired or wireless network interfaces 2203, one or more input/output interfaces 2204, and/or one or more operating systems such as Windows Server™, Mac OS X™, Unix™, Linux™, and FreeBSD™.

The central processing unit 2201 may perform the operations performed by the communications device in the embodiments shown in FIG. 19 to FIG. 20. Details are not described herein again.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, all or some of the procedures or the functions according to embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one location, or may be distributed on a plurality of network units. Some or all of the units may be selected according to an actual requirement to achieve the objectives of the solutions of embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and is sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A first device comprising:
a processor; and
a memory coupled to the processor, the memory comprising instructions that, when executed by the processor, cause the first device to perform a method comprising:
receiving a first message sent by a second device, wherein the first message is used by the first device to establish a first session with a third device,
wherein the first message carries a first identifier and a second identifier,
wherein the first identifier is a user equipment protocol data unit session identifier, and
wherein the second identifier is a vlan identifier that indicates information about a group of user equipment protocol data unit session identifiers to which the first identifier belongs; and
receiving a data packet that is sent by the third device by using the first session,
wherein the data packet is marked as belonging to the group indicated by the second identifier after receiving the first message.

2. A first device comprising:
a processor; and
a memory coupled to the processor, the memory comprising instructions that, when executed by the processor, cause the first device to perform a method comprising:
sending a third message to a fifth device,
wherein the third message is used by the first device to establish a first bearer with the fifth device,
wherein the third message carries a fifth identifier and a second identifier,
wherein the second identifier is a vlan identifier that indicates information about a group of user equipment protocol data unit session identifiers to which a fourth identifier belongs, and
wherein the fourth identifier is a user equipment data radio bearer identifier associated with a fourth device; and
sending a data packet to the fifth device by using the first bearer, wherein the data packet is marked as belonging to the group indicated by the second identifier after sending the third message.

3. The first device according to claim 2, wherein the method further comprises:
receiving a second list sent by the fifth device, wherein the second list is used by the fifth device to send the data packet to the fourth device in a unicast manner after sending the third message.

4. The first device according to claim 2, wherein the method further comprises:
receiving a sixth identifier sent by the fifth device, wherein the sixth identifier is used by the fifth device to send the data packet to the fourth device in a multicast manner after sending the third message.

5. The first device according to claim 4, wherein the method further comprises:
sending the sixth identifier to the fourth device, wherein the sixth identifier is used by the fourth device to receive the data packet that is sent by the fifth device in a multicast manner after sending the third message.

6. The first device according to claim 2, wherein the method further comprises:
receiving a first notification message sent by the fifth device, wherein the first notification message is used to notify the first device that the fifth device sends the data packet to the fourth device in a unicast manner after sending the third message.

7. A first device comprising:
a processor; and
a memory coupled to the processor, the memory comprising instructions that, when executed by the processor, cause the first device to perform a method comprising:
sending a fourth message to a fifth device,
wherein the fourth message is used by the first device to establish a second bearer with the fifth device,
wherein the fourth message carries a seventh identifier, a second identifier, and a set of fourth identifiers,
wherein each fourth identifier in the set of fourth identifiers is a user equipment data radio bearer-identifier,
wherein the seventh identifier is a group data radio bearer identifier in a one-to-one correspondence with a fourth identifier in the set of fourth identifiers, and
wherein the second identifier is a vlan identifier that indicates information about a group of user equipment protocol data unit session identifiers to which the fourth identifier in the set of fourth identifiers belongs; and
sending a data packet to the fifth device by using the second bearer, wherein the data packet is marked as belonging to the group indicated by the second identifier after sending the fourth message.

8. The first device according to claim 7, wherein the method further comprises:
receiving a list sent by the fifth device, wherein the list is used by the fifth device to send the data packet to the fourth device in a unicast manner after sending the fourth message.

9. The first device according to claim 7, wherein the method further comprises:
   receiving a sixth identifier sent by the fifth device, wherein the sixth identifier is used by the fifth device to send the data packet to the fourth device in a multicast manner after sending the fourth message.

10. The first device according to claim 9, wherein the method further comprises:
    sending the sixth identifier to the fourth device, wherein the sixth identifier is used by the fourth device to receive the data packet that is sent by the fifth device in a multicast manner after sending the fourth message.

11. The first device according to claim 7, wherein the method further comprises:
    receiving a first notification message sent by the fifth device, wherein the first notification message is used to notify the first device that the fifth device sends the data packet to the fourth device in a unicast manner after sending the fourth message.

12. The first device according to claim 7, wherein the method further comprises:
    receiving a second notification message sent by the fifth device, wherein the second notification message is used to notify the first device that the fifth device sends the data packet to the fourth device in a multicast manner after sending the fourth message.

\* \* \* \* \*

UNITED STATES PATENT AND TRADEMARK OFFICE
CERTIFICATE OF CORRECTION

PATENT NO. : 12,324,039 B2
APPLICATION NO. : 17/737791
DATED : June 3, 2025
INVENTOR(S) : Wang et al.

Page 1 of 1

It is certified that error appears in the above-identified patent and that said Letters Patent is hereby corrected as shown below:

In the Claims

Claim 7: Column 40, Line 47: "bearer-" should read as -- bearer --.

Signed and Sealed this
Twenty-first Day of October, 2025

John A. Squires
*Director of the United States Patent and Trademark Office*